US008782361B2

(12) United States Patent
Nasu et al.

(10) Patent No.: US 8,782,361 B2
(45) Date of Patent: Jul. 15, 2014

(54) MANAGEMENT SERVER AND DATA MIGRATION METHOD WITH IMPROVED DUPLICATE DATA REMOVAL EFFICIENCY AND SHORTENED BACKUP TIME

(75) Inventors: Hiroshi Nasu, Yokohama (JP); Wataru Okada, Machida (JP)

(73) Assignee: Hitachi, Ltd., Tokyo (JP)

( * ) Notice: Subject to any disclaimer, the term of this patent is extended or adjusted under 35 U.S.C. 154(b) by 778 days.

(21) Appl. No.: 12/921,724

(22) PCT Filed: Aug. 31, 2010

(86) PCT No.: PCT/JP2010/005356
§ 371 (c)(1),
(2), (4) Date: Sep. 9, 2010

(87) PCT Pub. No.: WO2012/029091
PCT Pub. Date: Mar. 8, 2012

(65) Prior Publication Data
US 2012/0102280 A1    Apr. 26, 2012

(51) Int. Cl.
*G06F 12/00* (2006.01)
*G06F 12/16* (2006.01)
*G06F 7/00* (2006.01)

(52) U.S. Cl.
USPC ............................ 711/162; 711/161; 707/692

(58) Field of Classification Search
None
See application file for complete search history.

(56) References Cited

U.S. PATENT DOCUMENTS 6,928,526 B1    8/2005  Zhu et al.
8,315,992 B1 *  11/2012 Gipp et al. .................... 707/692

2008/0071841 A1    3/2008 Okada et al.
2008/0215843 A1    9/2008 Nasu et al.
2009/0083563 A1 * 3/2009 Murase ........................ 713/324
2009/0150639 A1    6/2009 Ohata
2011/0231172 A1 * 9/2011 Gold .............................. 703/13

FOREIGN PATENT DOCUMENTS

EP    1 764 678 A1    3/2007
EP    2 042 979 A2    4/2009

OTHER PUBLICATIONS

International Search Report and the Written Opinion of the International Searching Authority, issued in International Patent Application No. PCT/JP2010/005356, dated Apr. 18, 2011.

* cited by examiner

*Primary Examiner* — Sanjiv Shah
*Assistant Examiner* — Glenn Gossage
(74) *Attorney, Agent, or Firm* — McDermott Will & Emery LLP

(57) ABSTRACT

A management server and a data migration method shorten a data backup processing time and improve the efficiency of data duplicate removal in a storage apparatus. The management server includes a backup capacity calculation unit for calculating, based on duplicate information of data stored in a plurality of storage apparatuses, a backup capacity of the data if duplicate data is removed. The management server includes a migration source data determination unit for determining, based on the calculated backup capacity, data which is a target for migration to another storage apparatus among data stored in one of the storage apparatuses. The management server further includes a migration destination storage apparatus determination unit for determining, based on duplicate information of the migration target data and data of a storage apparatus which is a migration destination for the data, a migration destination storage apparatus for the data.

12 Claims, 29 Drawing Sheets

FIG.7

FIRST STORAGE APPARATUS 200a

| POOL ID | TOTAL CAPACITY | FREE CAPACITY |
|---|---|---|
| 0 | 1000GB | 300GB |

2361  2362  2363  2360

SECOND STORAGE APPARATUS 200b

| POOL ID | TOTAL CAPACITY | FREE CAPACITY |
|---|---|---|
| 0 | 2000GB | 1000GB |

2361  2362  2363  2360

THIRD STORAGE APPARATUS 200c

| POOL ID | TOTAL CAPACITY | FREE CAPACITY |
|---|---|---|
| 0 | 1800GB | 900GB |

FIRST STORAGE 200a

| VOLUME ID | POOL ID | CAPACITY | LUN | INITIATOR WWPN | TARGET WWPN |
|---|---|---|---|---|---|
| 0 | 0 | 100GB | 00 | WWPN_H00 | WWPN_S00 |
| 1 | 0 | 200GB | 01 | WWPN_H00 | WWPN_S00 |
| 2 | 0 | 400GB | 02 | WWPN_H01 | WWPN_S01 |

2371　2372　2373　2374　2375　2376　2370

SECOND STORAGE 200b

| VOLUME ID | POOL ID | CAPACITY | LUN | INITIATOR WWPN | TARGET WWPN |
|---|---|---|---|---|---|
| 0 | 0 | 1000GB | 10 | WWPN_H10 | WWPN_S10 |
| 1 | 0 | 300GB | 11 | WWPN_H10 | WWPN_S10 |

2371　2372　2373　2374　2375　2376　2370

THIRD STORAGE 200c

| VOLUME ID | POOL ID | CAPACITY | LUN | INITIATOR WWPN | TARGET WWPN |
|---|---|---|---|---|---|
| 0 | 0 | 600GB | 20 | WWPN_H20 | WWPN_S20 |
| 1 | 0 | 300GB | 21 | WWPN_S11 | WWPN_S21 |

FIRST STORAGE APPARATUS 200a

| VOLUME ID | EXTERNAL LUN | EXTERNAL INITIATOR WWPN | EXTERNAL TARGET WWPN |
|---|---|---|---|
| NULL | NULL | NULL | NULL |

2381　2382　2383　2384　2380

SECOND STORAGE APPARATUS 200b

| VOLUME ID | EXTERNAL LUN | EXTERNAL INITIATOR WWPN | EXTERNAL TARGET WWPN |
|---|---|---|---|
| 1 | 21 | WWPN_S12 | WWPN_S21 |

2381　2382　2383　2384　2380

THIRD STORAGE APPARATUS 200c

| VOLUME ID | EXTERNAL LUN | EXTERNAL INITIATOR WWPN | EXTERNAL TARGET WWPN |
|---|---|---|---|
| NULL | NULL | NULL | NULL |

FIRST STORAGE APPARATUS 200a

| POOL ID | VOLUME ID | BLOCK ADDRESS | HASH VALUE | POINTER |
|---|---|---|---|---|
| 0 | 0 | 0 | aa55jj | NULL |
| ... | ... | ... | ... | ... |
| 0 | 1 | 0 | aa55jj | 0:0:0 |
| ... | ... | ... | ... | ... |
| 0 | 2 | 0 | wwmm44 | NULL |
| 0 | 2 | 1 | qq2211 | NULL |
| ... | ... | ... | ... | ... |

2391  2392  2393  2394  2395  2390

SECOND STORAGE APPARATUS 200b

| POOL ID | VOLUME ID | BLOCK ADDRESS | HASH VALUE | POINTER |
|---|---|---|---|---|
| 0 | 0 | 0 | wwmm44 | NULL |
| 0 | 0 | 1 | qq2211 | NULL |
| ... | ... | ... | ... | ... |
| 0 | 1 | 0 | NULL | NULL |
| ... | ... | ... | ... | ... |

2391  2392  2393  2394  2395  2390

THIRD STORAGE APPARATUS 200c

| POOL ID | VOLUME ID | BLOCK ADDRESS | HASH VALUE | POINTER |
|---|---|---|---|---|
| 0 | 0 | 0 | XX66ss | NULL |
| ... | ... | ... | ... | ... |
| 0 | 1 | 0 | eeRR77 | 0:0:325 |
| ... | ... | ... | ... | ... |

| STORAGE ID | POOL ID | FREE CAPACITY |
|---|---|---|
| 0 | 0 | 300 |
| 1 | 0 | 1000 |
| 2 | 0 | 900 |

| No | STORAGE ID | POOL ID | VOLUME ID | BLOCK ADDRESS | HASH VALUE | POINTER |
|---|---|---|---|---|---|---|
| 0 | 0 | | 0 | 0 | aa55jj | NULL |
| 1 | 0 | | ... | ... | ... | ... |
| 2 | 0 | | 1 | 0 | aa55jj | 0 |
| ... | 0 | | ... | ... | ... | ... |
| 104 | 0 | | 2 | 0 | wwmm44 | NULL |
| 105 | 0 | | 2 | 1 | qq2211 | NULL |
| ... | 0 | | ... | ... | ... | ... |
| 338 | 1 | | 0 | 0 | wwmm44 | NULL |
| 339 | 1 | | 0 | 1 | qq2211 | NULL |
| ... | 1 | | ... | ... | ... | ... |
| ... | 1 | | 1 | 0 | NULL | NULL |
| ... | 1 | | ... | ... | ... | ... |
| ... | 2 | | 0 | 0 | XX66ss | NULL |
| ... | 2 | | ... | ... | ... | ... |
| ... | 2 | | 1 | 0 | eeRR77 | 525 |
| ... | 2 | | ... | ... | ... | ... |

| No | STORAGE ID | POOL ID | VOLUME ID | BLOCK ADDRESS | HASH VALUE | POINTER |
|---|---|---|---|---|---|---|
| 104 | 1 | 0 | 2 | 0 | wwmm44 | 338 |
| 105 | 1 | 0 | 2 | 1 | qq2211 | 339 |
| 3351 | 3352 | 3353 | 3354 | 3355 | 3356 | 3357 |

| BACKUP SERVER ID | BANDWIDTH | TIME LIMIT | BACKUP STORAGE ID | BACKUP CAPACITY | BACKUP CAPACITY ESTIMATE |
|---|---|---|---|---|---|
| 0 | 10GB/H | 3H | 0 | 35GB | |
| 1 | 10GB/H | 3H | 1 | 7GB | |
| 1 | 10GB/H | 3H | 2 | 13GB | |
| 3361 | 3362 | 3363 | 3364 | 3365 | 3366 |

| MIGRATION SOURCE VOLUME ID (3371) | BACKUP VOLUME ID (3372) | BACKUP CAPACITY ESTIMATE (3373) |
|---|---|---|
| 0 | 1,2 | 24GB |
| 1 | 0,2 | 29GB |
| 2 | 0,1 | 11GB |

| MIGRATION DESTINATION STORAGE ID (3381) | BACKUP CAPACITY ESTIMATE (3382) |
|---|---|
| 1 | 9GB |
| 2 | 20GB |

MIGRATION OF BACKUP VOLUMES FULFILLING REQUIREMENTS

| MIGRATION SOURCE | | | MIGRATION DESTINATION | | |
|---|---|---|---|---|---|
| VOLUME ID | STORAGE ID | POOL ID | VOLUME ID | STORAGE ID | POOL ID |
| 2 | 0 | 0 | 2 | 1 | 0 |

CHANGE BACKUP DATA CAPACITY RESULTING FROM BACKUP VOLUME MIGRATION

| STORAGE ID | BACKUP EXECUTION TIME LIMIT | BACKUP EXECUTION TIME ESTIMATE | |
|---|---|---|---|
| | | BEFORE MIGRATION | AFTER MIGRATION |
| 0 | | | |
| 1 | | | |
| 2 | | | |

MIGRATION OF BACKUP VOLUME EXECUTED?

OK    CANCEL

FIG.29

| MIGRATION DESTINATION STORAGE APPARATUS ID | BACKUP CAPACITY ESTIMATE | MIGRATION EXECUTION TIME ESTIMATE |
|---|---|---|
| 1 | 4GB | |
| 2 | 4.5GB | |

MIGRATION OF BACKUP VOLUME SATISFYING REQUIREMENTS

| MIGRATION SOURCE | | | MIGRATION DESTINATION | | | MIGRATION EXECUTION TIME ESTIMATE |
|---|---|---|---|---|---|---|
| VOLUME ID | STORAGE APPARATUS ID | POOL ID | VOLUME ID | STORAGE APPARATUS ID | POOL ID | |
| 2 | 0 | 0 | 2 | 1 | 0 | |

CHANGE IN BACKUP DATA CAPACITY DUE TO BACKUP VOLUME MIGRATION

| STORAGE APPARATUS ID | BACKUP EXECUTION TIME LIMIT | BACKUP EXECUTION TIME ESTIMATE | |
|---|---|---|---|
| | | BEFORE MIGRATION | AFTER MIGRATION |
| 0 | | | |
| 1 | | | |
| 2 | | | |

BACKUP VOLUME MIGRATION EXECUTED?

( OK )  ( CANCEL )

MANAGEMENT SERVER AND DATA MIGRATION METHOD WITH IMPROVED DUPLICATE DATA REMOVAL EFFICIENCY AND SHORTENED BACKUP TIME

RELATED APPLICATIONS

This application is the U.S. National Stage under 35 U.S.C. §371 of International Application No. PCT/JP2010/005356, filed on Aug. 31, 2010, the disclosure of which Application is incorporated by reference herein.

TECHNICAL FIELD

The present invention relates to a management server and a data migration method, and is suitably applied to a management server for managing a storage apparatus with a data duplicate removal function, and to a data migration method, for example.

BACKGROUND ART

A storage apparatus that is connected to a host computer via a network comprises a plurality of magnetic disks as storage devices for storing data, for example. The storage apparatus utilizes RAID (Redundant Arrays of Independent Disks) technology to render redundant the storage areas of the plurality of storage devices and construct a RAID group. In addition, the storage apparatus provides the host computer with storage areas from part of the RAID group and of the capacity required by the host computer, as logical volumes.

Furthermore, data duplicate removal technology is attracting attention for the purpose of suppressing the increased data volumes stored on the aforementioned magnetic disks and of raising data capacity efficiencies. Data duplicate removal technology is technology with which, if data that is newly written to a storage device, or so-called 'write data' has the same content as data already stored on a magnetic disk, duplicate data is not written to the magnetic disk. Verification of whether the write data has the same content as the data stored on the magnetic disk is typically performed using the data hash values (for example, PTL1).

CITATION LIST

Patent Literature

[PTL 1] U.S. Patent Publication No. 6928526

SUMMARY OF INVENTION

Technical Problem

In a large-scale system comprising a plurality of the storage apparatuses above, when a new storage apparatus is added, a backup server is normally also added in order to distribute the backup processing load. In this case, applying the aforementioned data duplicate removal technology in each storage apparatus may be considered in order to reduce the backup processing load on each backup server.

When backup processing is executed by applying the data duplicate removal technology, the backup processing time is sometimes set with consideration for a reduction in the backup data volume as a result of the data duplicate removal processing. However, if the data duplication rate between backup target volumes in the storage apparatuses is low, the effect of data duplicate removal processing is reduced and consequently the problem that the backup data volume increases and the backup processing time no longer lies within the expected time limit may occur.

The present invention was conceived in view of the aforementioned points and proposes a storage apparatus and data backup method with which the data duplicate removal efficiency in the storage apparatus can be improved and the data backup processing time can thus be reduced.

Solution to Problem

In order to solve the above problems, the present invention provides a management server which is mutually coupled via a network to each of a plurality of storage apparatuses, a backup server for storing data stored in the storage apparatuses to a backup device, and a plurality of host apparatuses which request data writing to the plurality of storage apparatuses, the management server comprising a backup capacity calculation unit for calculating, on the basis of duplicate information on the data stored in the storage apparatuses, a backup capacity of the data if duplicate data is removed; a migration source data determination unit for determining, on the basis of the backup capacity of the data calculated by the backup capacity calculation unit, migration target data which is a target for migration to another storage apparatus among data stored in one of the storage apparatuses; and a migration destination storage apparatus determination unit for determining, on the basis of data duplicate information on the migration target data and data of the other storage apparatus which is a migration destination for the data, a migration destination storage apparatus for the data.

In this configuration, among the plurality of storage apparatuses coupled to the management server, data to be migrated is determined on the basis of the data backup capacity if duplicate data is removed, and the data migration destination storage apparatus is determined on the basis of the data duplication rate of the data to be migrated and the data of the storage apparatus which is to be the migration destination. As a result, data with a low duplication rate can be migrated to another storage apparatus with a high data duplication rate to improve the data duplicate removal efficiency and shorten the data backup processing time.

Advantageous Effects of Invention

By the present invention, data backup processing time can be shortened by improving the efficiency of data duplicate removal in the storage apparatus.

BRIEF DESCRIPTION OF DRAWINGS

FIG. 7 shows illustrative pool capacity management tables according to the first embodiment.

FIG. 8 shows illustrative internal volume management tables according to the first embodiment.

FIG. 9 shows illustrative external volume management tables according to the first embodiment.

FIG. 10 shows illustrative duplicate data management tables according to the first embodiment.

FIG. 14 is a table showing an example of a free pool capacity management table according to the first embodiment.

FIG. 15 is a table showing an example of a duplicate backup data management table according to the first embodiment.

FIG. 16 is a table showing an example of a backup volume migration management table according to the first embodiment.

FIG. 17 is a table showing an example of a backup performance data management table according to the first embodiment.

FIG. 18 is a table showing an example of a backup data reduced capacity estimate management table according to the first embodiment.

FIG. 19 is a table showing an example of a backup data increased capacity estimate management table according to the first embodiment.

FIG. 25 is a conceptual view of the content of a first confirmation screen according to the first embodiment.

FIG. 29 is a table showing an example of a backup data increased capacity estimate management table according to a third embodiment of the present invention.

FIG. 30 is a conceptual view of the content of a second confirmation screen according to the first embodiment.

DESCRIPTION OF EMBODIMENTS

An embodiment of the present invention will be described in detail hereinbelow with reference to the drawings.

(1) First Embodiment (1-1) Hardware Configuration of the Computer System

Figure 1:
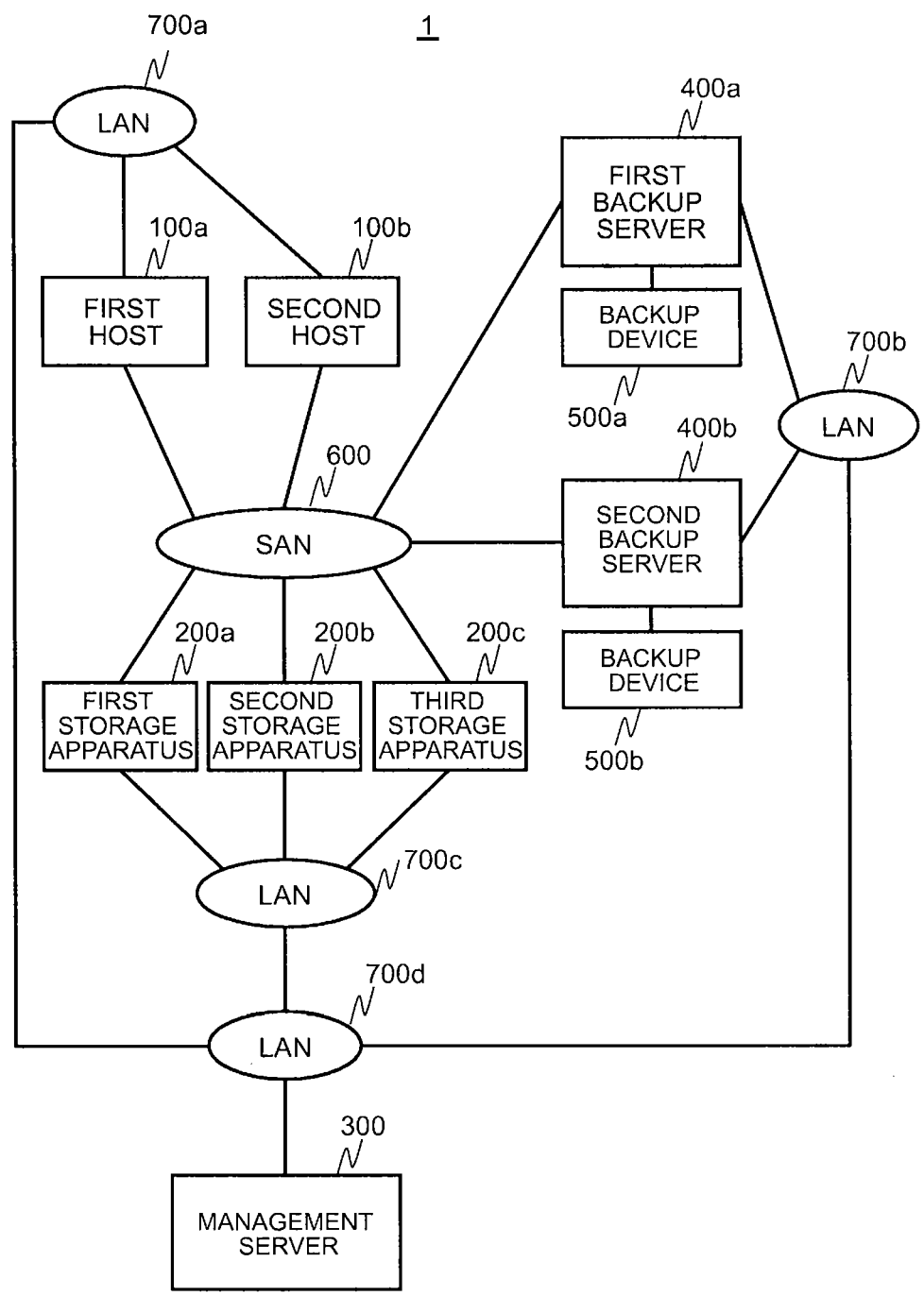
FIG. 1 is block diagram showing the hardware configuration of a computer system according to a first embodiment of the present invention.

First the hardware configuration of a computer system 1 according to this embodiment will be described with reference to FIG. 1. As shown in FIG. 1, the computer system 1 according to this embodiment comprises first and second hosts 100a, 100b (hereinafter the first and second hosts are sometimes also referred to simply as the 'hosts 100'), first to third storage apparatuses 200a, 200b, 200c (hereinafter the first to third storage apparatuses are sometimes also referred to simply as the 'storage apparatuses 200'), a management server 300, first and second backup servers 400a, 400b (hereinafter the first and second backup servers are sometimes also referred to simply as the 'backup servers 400'), backup devices 500a and 500b (hereinafter sometimes also referred to simply as 'backup devices 500'), a SAN (Storage Area Network) 600, LANs (Local Area Networks) 700a, 700b, 700c, and 700d (hereinafter sometimes also referred to simply as the 'LANs 700').

The hosts 100 are computer apparatuses comprising information processing resources such as a CPU (Central Processing Unit) and a memory, and comprise a personal computer, workstation, mainframe or similar, for example. The hosts 100 are interconnected to the storage apparatuses 200 via the SAN 600, and a block protocol such as a SCSI (Small Computer System Interface) is used for communication between these apparatuses.

The storage apparatuses 200 parse commands transmitted from the hosts 100 and execute reads/writes in the storage area of the storage apparatuses 200. The management server 300 is a computer device which comprises information processing resources such as a CPU and memory and which manages the storage apparatuses 200 and so forth in accordance with operator inputs and the like. The management server 300 is interconnected with the hosts 100, storage apparatuses 200, and backup servers 400 via the LANs 700.

The backup servers 400 are interconnected with the backup devices 500 and execute backups of data stored in the storage apparatuses 200 on the basis of instructions from the management server 300. The backup devices 500 are devices for storing backup data of data which is stored on the storage media of the storage apparatuses 200 and comprise, for example, a tape library with a plurality of tape storage media and hard disk devices and so on.

In this embodiment, the hosts 100, storage apparatuses 200, and backup servers 400 are interconnected via the SAN 600 and the management server 300 and the hosts 100, the management server 300 and the storage apparatuses 200, and the management server 300 and the backup servers 400 are interconnected via the LANs 700, but the present invention is not limited to this example. For example, all the inter-device networks may be connected via the same network.

The storage apparatuses 200 according to this embodiment comprise a data duplicate removal function. The data duplicate removal function is a function which, for example if a data backup or the like is performed, detects, as duplicate data, data of the same content among data stored in the storage area of the storage apparatuses 200 and which backs up data except duplicate data. Here, a summary of backup processing of conventional data using the data duplicate removal function and data backup processing according to this embodiment will be explained.

Conventionally, in a computer system comprising a plurality of the storage apparatuses, when a storage apparatus is added on, a backup server is added on in order to distribute the backup processing load. In this case, data backup processing is executed by applying the data duplicate removal technology in each storage apparatus in order to reduce the backup processing load on each backup server.

Figure 2:
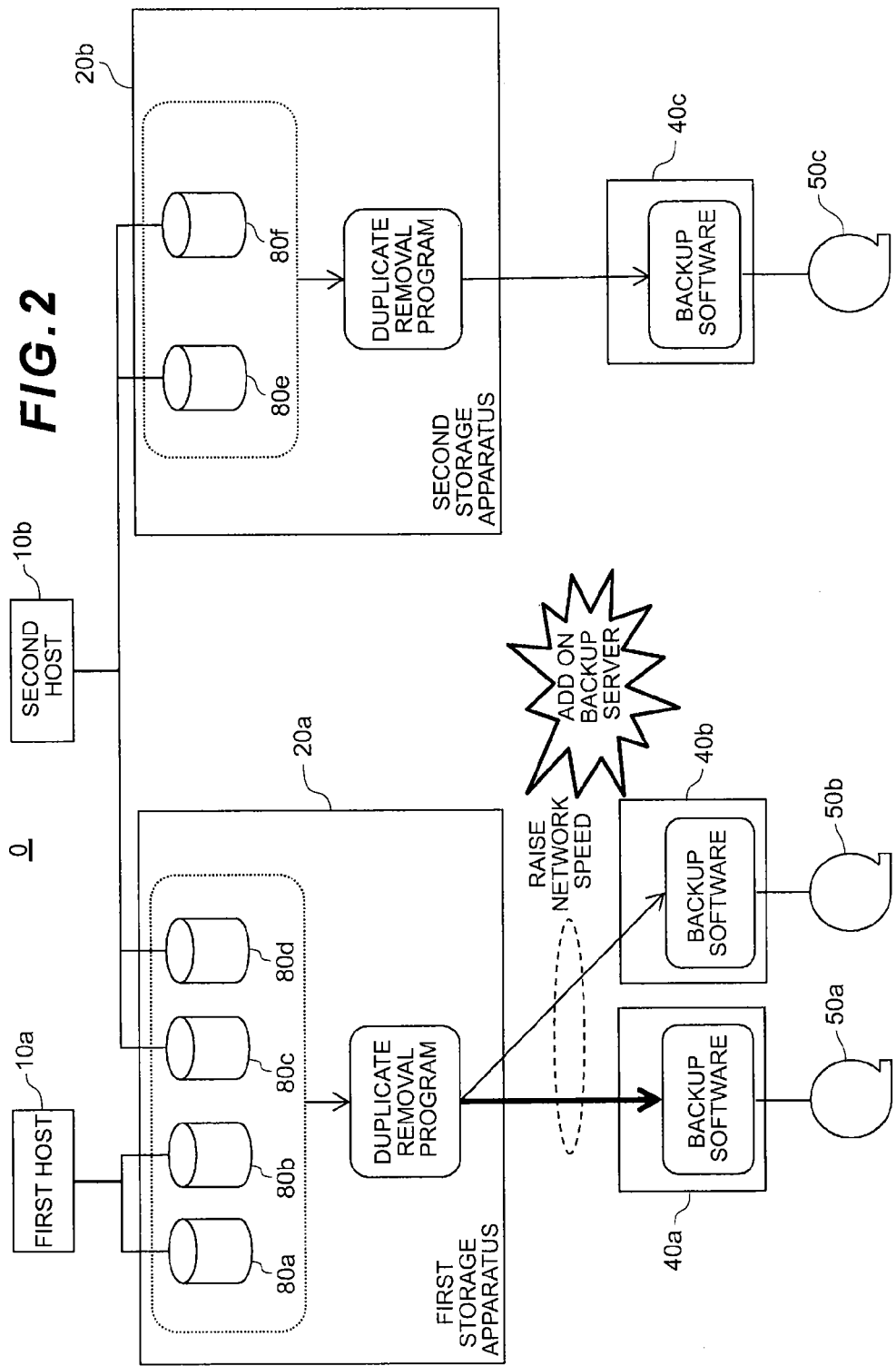
FIG. 2 is a conceptual view providing an overview of conventional data backup processing.

For example, as shown in FIG. 2, data duplicate removal processing in each storage apparatus is performed in order to shorten the backup processing time in a computer system 0 which comprises a first storage apparatus 20a and a second storage apparatus 20b. More specifically, data hash values are used to verify whether or not there is duplicate data in each storage apparatus among the data stored in the volumes 80a, 80b, 80c, 80d of the storage apparatus 20a and the volumes 80e, 80f of the storage apparatuses 20b. Furthermore, data except for duplicate data is transferred to the backup servers 40a, 40b and recorded on backup devices 50a and 50b.

When data backup processing is executed, the backup processing time is sometimes configured by anticipating a reduction in the backup data volume as a result of the data duplicate removal processing. However, if the data duplication rate between backup target volumes in the storage apparatuses is low, the effect of data duplicate removal processing is reduced and consequently there is the problem that the backup data volume increases and the backup processing time no longer lies within the expected time limit. Hence, in order to shorten the backup processing time, adding on a backup server or raising the speed of the network for backup processing may also be considered but resources and costs increase.

Figure 3:
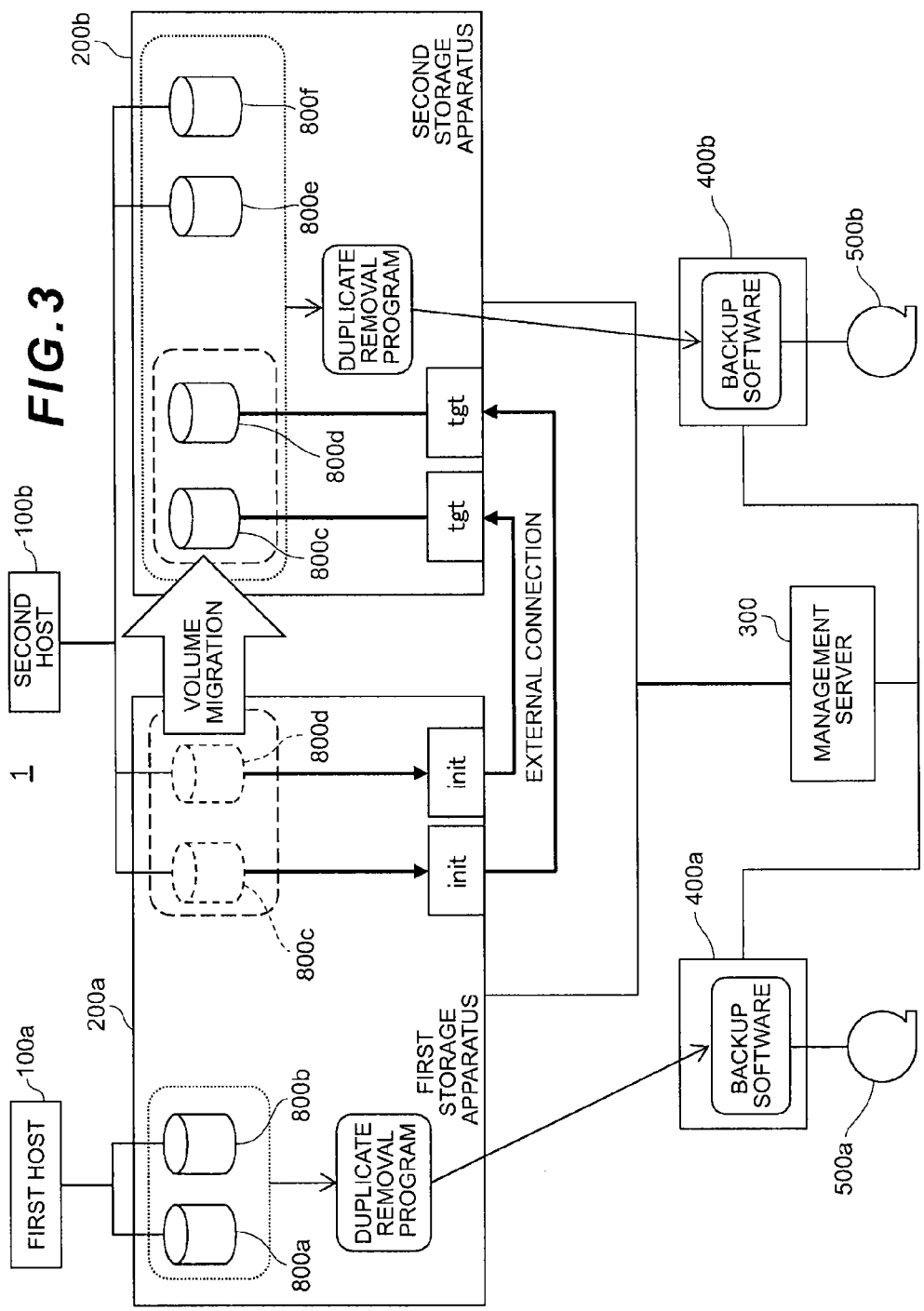
FIG. 3 is a conceptual view providing an overview of backup processing according to the first embodiment of the present invention.

Therefore, in accordance with the present invention, the backup processing time is shortened by improving the data duplicate removal efficiency of the storage apparatuses without adding an additional backup server or raising the network speed. As shown in FIG. 3, in this embodiment, the hash values of the data stored in the storage area of each storage apparatus 200, the volume of data to be backed up, and the expected backup completion time are centrally managed in the management server 300.

Furthermore, as the duplicate removal efficiency increases between storage apparatuses, the backup target volume for migration between storage apparatuses is selected. For example, if the data duplication rate is low in the storage apparatus 200a, and the backup processing time does not fall within the estimated time limit even when data duplicate removal processing is executed, any of the volumes of the backup target volumes (sometimes also described simply as 'volumes' hereinbelow) 800a to 800d in the storage apparatus 200a is migrated to another storage apparatus.

Suppose, for example, that, as shown in FIG. 3, the volumes 800a and 800b of the first storage apparatus 200a are used by a first host and that volumes 800c and 800d of the first storage apparatus 200a are used by a second host 100b. Suppose also that volumes 800e and 800f of the second storage apparatus 200b are used by the second host 100b. In this case, the data duplication rate between volumes used by the same host is believed to be high. In other words, the data duplication rate between the volumes 800c and 800d and volumes 800e and 800f is expected to be higher than the data duplication rate between volumes 800a and 800b and volumes 800c and 800d.

In this embodiment, if the data backup processing time exceeds the time limit, the volumes to be migrated are determined in view of the data duplication rate between volumes. More specifically, the data hash values of each volume are centrally managed by the management server 300 and the duplication rates between servers are each calculated to determine the volumes to be migrated.

For example, in the first storage apparatus 200a, if the data backup processing time exceeds the time limit, it is necessary to determine which storage apparatus a given volume is to be migrated to. Therefore, if the duplication rate between volumes is calculated and the data duplication rate between the volumes 800c and 800d and volumes 800e and 800f is high, volumes 800c and 800d in the first storage apparatus are migrated to the second storage apparatus. Executing duplicate removal processing on volumes 800c to 800f then enables the data backup processing time to be shortened and a data backup to be performed within the time limit.

Note that, in volume migration, by externally connecting the first storage apparatus to the second storage apparatus 200b via a Fibre Channel interface (FC) or the like and logically mapping a volume of the second storage apparatus 200b to a volume of the first storage apparatus 200a, a volume in the first storage apparatus 200a can be managed similarly to a volume in the second storage apparatus 200b.

As mentioned earlier, according to this embodiment, the data backup processing time can be shortened by executing volume migration so that the data duplicate removal efficiency improves without adding on a backup server or raising the speed of the network.

(2-2) Configuration of Each Device (2-2-1) Host Configuration

Figure 4:
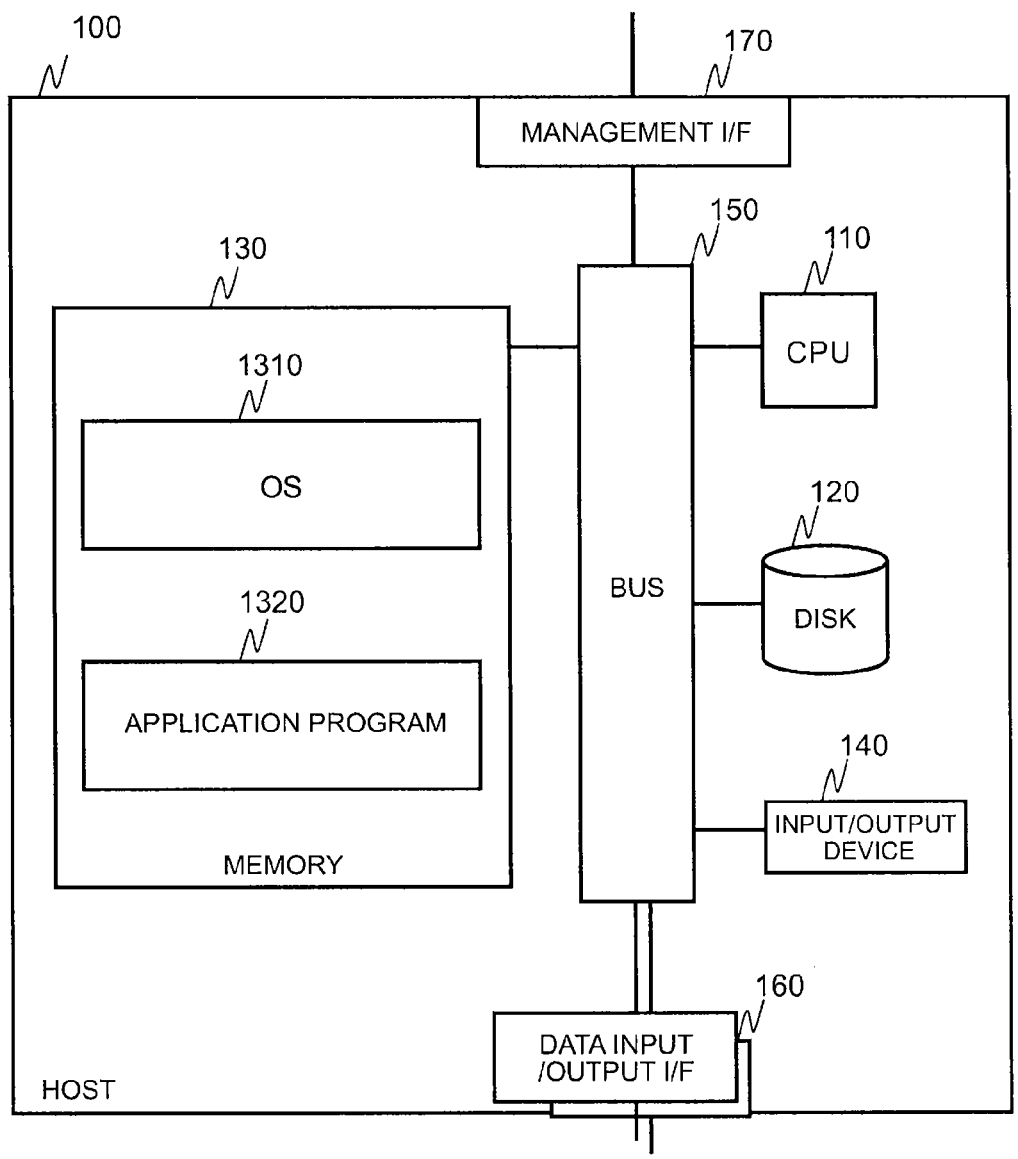
FIG. 4 is a block diagram showing a hardware configuration and software configuration of a host according to the first embodiment.

The hardware configuration and software configuration of the hosts 100 will be described next with reference to FIG. 4. As shown in FIG. 4, the hosts 100 comprise a CPU (Central Processing Unit) 110, a disk 120, a memory 130, an input/output device 140, a bus 150, a data input/output I/F (interface) 160 and a management I/F (interface) 170 and so forth. The CPU 110 functions as an arithmetic processing unit and controls the operation of the host 100 as a whole in accordance with an OS (operating system) 1310, an application program 1320 and computational parameters and the like which are stored in the memory 130.

The disk 120 is a device for storing data which comprises a hard disk drive (HDD), for example. The input/output device 140 comprises an input device such as a keyboard, switch, pointing device, or microphone, and an output device such as a monitor display or speaker, or the like.

The bus 150 has a function for interconnecting each of the devices which the host 100 comprises, and comprises, for example, a host bus that comprises a CPU bus or the like, a bridge, and so on. The data input/output I/F 160 is an interface which is connected to the storage apparatuses 200 via a SAN 600 and which sends and receives various information to/from the storage apparatuses 200. In addition, the management I/F 170 is an interface which is connected to the management server 300 via the LAN 700 and which sends and receives various information to/from the management server 300.

(2-2-2) Storage Apparatus Configuration

Figure 5:
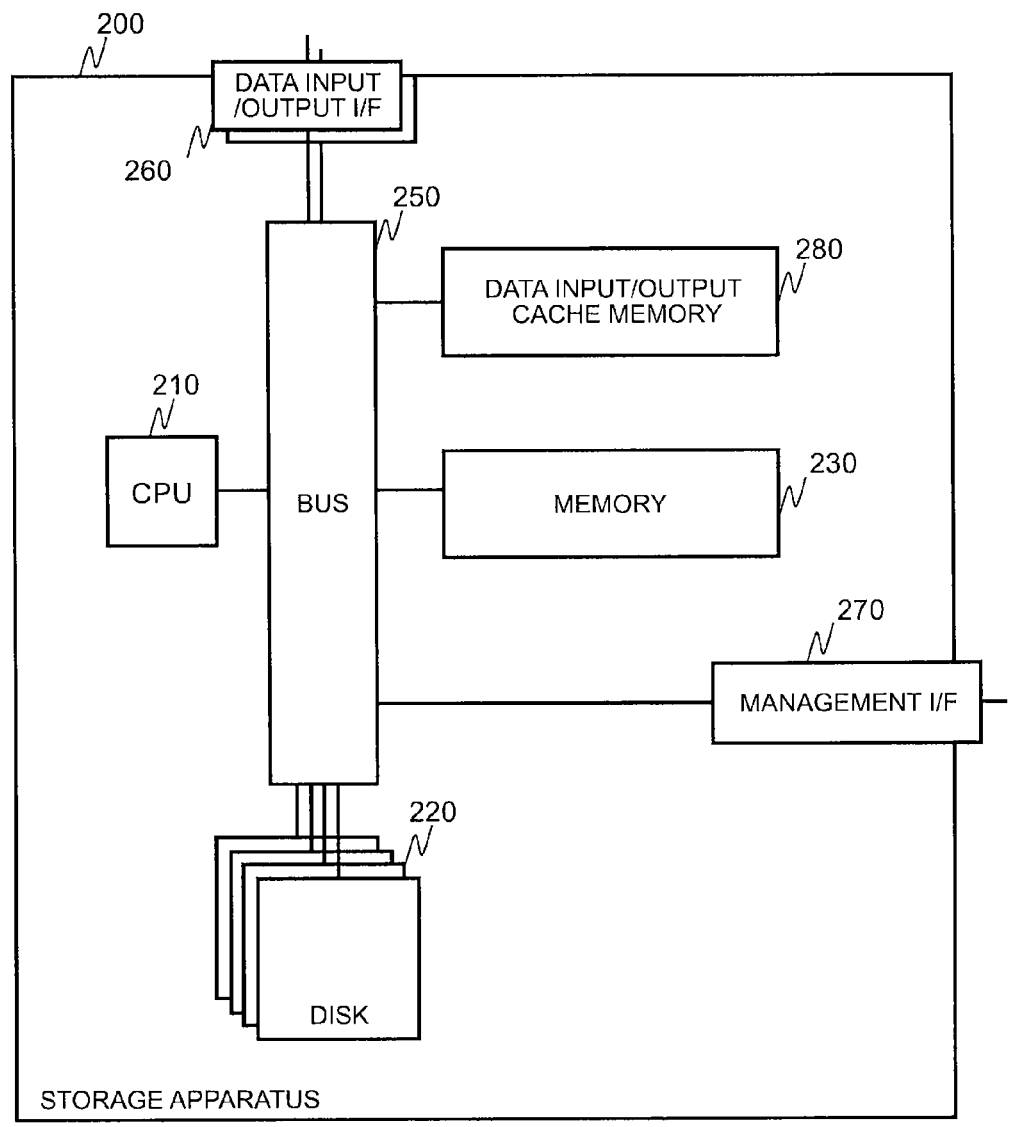
FIG. 5 is a block diagram showing a hardware configuration of a storage apparatus according to the first embodiment.

The hardware configuration of the storage apparatuses 200 will be described next with reference to FIG. 5. As shown in FIG. 5, the storage apparatuses 200 comprise a CPU (Central Processing Unit) 210, disks 220, a memory 230, a bus 250, a data input/output I/F 260 and a management I/F 270 and so forth. The CPU 210 functions as an arithmetic processing unit and controls the operation of the storage apparatuses 200 as a whole in accordance with various programs and computational parameters and the like which are stored in the memory 230. The main program stored in the memory 230 will be described in detail subsequently.

The disks 220 comprise a plurality of storage media. For example, the disks 220 may comprise a plurality of hard disk drives which are high-cost hard disk drives such as SSD (Solid State Disk) and SCSI (Small Computer System Interface) disks or low-cost hard disk drives such as SATA (Serial AT Attachment) disks. The bus 250 has a function for interconnecting each of the devices which the storage apparatus 200 comprises, and comprises, for example, a host bus that comprises a CPU bus or the like, a bridge, and so on. The data input/output I/F 260 is an interface which is connected to the host apparatus 100 via a SAN 600 and which is for sending and receiving various information to/from the host apparatus 100. In addition, the management I/F 270 is an interface which is connected to the management server 300 via the LAN 700 and which is for sending and receiving various information to/from the management server 300.

Figure 6:
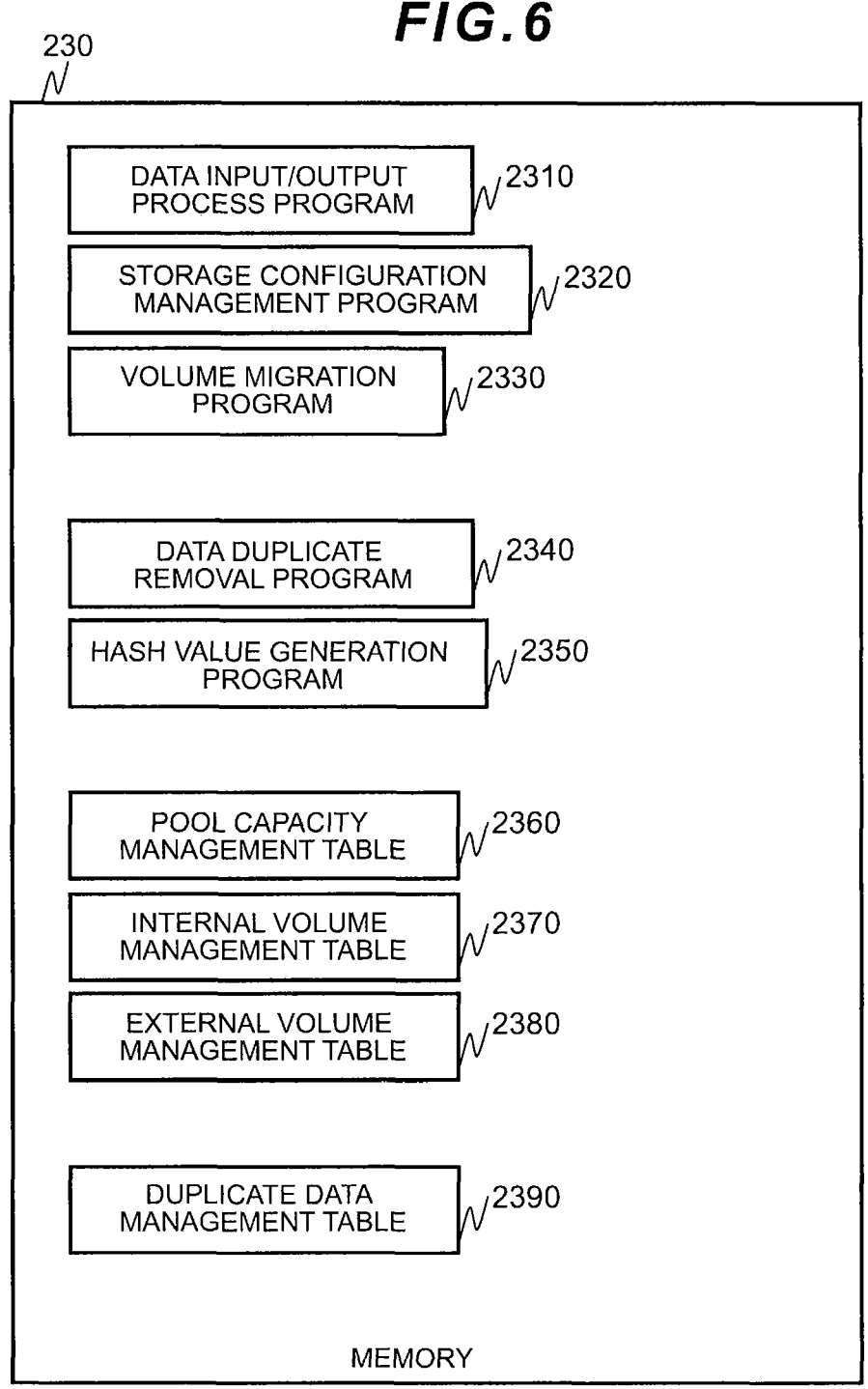
FIG. 6 is a block diagram showing a software configuration of the storage apparatus according to the first embodiment.

The programs and tables which are stored in the memory 230 will be described next with reference to FIG. 6. The memory 230 stores a data input/output process program 2310, a storage configuration management program 2320, a volume migration program 2330, a data duplicate removal program 2340, a hash value generation program 2350, a pool capacity management table 2360, an internal volume management table 2370, an external volume management table 2380, and a duplicate data management table 2390, and the like, for example.

The data input/output process program 2310 reads data stored on the disks 220 or writes data to the disks 220 in accordance with a data read/write request from the hosts 100. In addition, the storage configuration management program 2320 manages the storage areas of the disks 220 as pools.

Here a pool is an aggregate of storage areas which the storage apparatuses 200 provide to the hosts 100, and may be a pool provided by a RAID group or a pool provided by Thin Provisioning, for example. For example, in the case of a pool that is provided by the RAID group, one RAID group comprises a plurality of disks and one or a plurality of logical volumes are defined in the storage area provided by one RAID group. Furthermore, logical volumes which are provided by a plurality of RAID groups are managed as a single pool.

The volume migration program 2330 migrates volumes which are to be migrated between the storage apparatuses and externally connects the migrated volumes. Here, volume migration is performed by migrating data which is stored in a volume and associating the address of a migration source volume with an address of a post-migration volume. Additionally, as a result of the external connection function of the storage apparatuses 200, if there is access from the host 100 to the migration source volume, the relevant data can be acquired by accessing the post-migration volume associated with the migration source volume. As a result, the storage apparatus 200 is capable of handling data which is migrated to another storage apparatus as if the storage apparatus 200 itself were storing this data.

The data duplicate removal program 2340 uses hash values which are generated by the hash value generation program 2350 (described subsequently) to execute the removal of data duplicates stored in the storage apparatus 200. More specifically, among the stored data, data having identical hash values is detected as identical-content duplicate data. The hash value generation program 2350 generates the hash values of each of the data.

The pool capacity management table 2360 is a table for managing the pool capacity of the storage apparatuses 200 and the free pool capacity thereof, and comprises a pool ID field 2361, a total capacity field 2362, and a free capacity field 2363, and the like. FIG. 7 shows information stored in the pool capacity management table 2360 which is stored respectively in each memory of the first storage apparatus 200a, the second storage apparatus 200b, and the third storage apparatus 200c.

The pool ID field 2361 stores information identifying pools that are contained in the storage apparatuses 200. The total capacity field 2362 stores information showing the total capacity of each pool. The free capacity field 2363 stores information showing the free capacity where no data is stored, in each pool. For example, as shown in FIG. 7, the total capacity of pool0 of the storage apparatus 200a is 1000 GB, and of this 1000 GB, the free capacity is 300 GB.

Furthermore, the internal volume management table 2370 is a table for managing information relating to volumes in each storage apparatus 200 and, as shown in FIG. 8, comprises a volume ID field 2371, a pool ID field 2372, a capacity field 2373, a LUN (Logical Unit Number) field 2374, an initiator WWPN (World Wide Port Number) field 2375, and a target WWPN field 2376, or the like. FIG. 8 shows information stored in the internal volume management table 2370 which is stored respectively in each memory of the first storage apparatus 200a, the second storage apparatus 200b, and the third storage apparatus 200c.

The volume ID field 2371 stores information identifying volumes belonging to the pools. The pool ID field 2372 stores information identifying the pool to which each volume belongs. The capacity field 2373 stores information showing the capacity of each volume. The LUN field 2374 stores information showing the ID number of the logical volumes. The ID number of a logical volume is the ID number when the volume is provided to the host 100 as a logical volume.

The initiator WWPN field 2375 stores information indicating the port number of the host 100 to which the storage apparatus 200 is connected, and the target WWPN 2376 field stores information indicating the port number associated with each volume indicated by the host 100. For example, it can be seen that the volume with the volume ID '0' in the first storage apparatus 200a belongs to the pool with the pool ID '0', has the capacity '100 GB', and is identified by the host 100 as the logical volume '00'. Furthermore, this volume is connected to the first host 100a with a connection port identified by the port number 'WWPN_H00', and is connected to the first host 100a via a connection port that is identified by the port number 'WWPN_S00'.

The external volume management table 2380 is a table for managing information relating to volumes which are externally connected to another storage apparatus and, as shown in FIG. 9, comprises a volume ID field 2381, an external LUN field 2382, an external initiator WWPN field 2383, and an external target WWPN field 2384, or the like. FIG. 9 shows information stored in the external volume management table 2380 which is stored respectively in each memory of the first storage apparatus 200a, the second storage apparatus 200b, and the third storage apparatus 200c.

The volume ID field 2381 stores information identifying volumes which are externally connected to another storage apparatus. The external LUN field 2382 stores the ID number when the volume is provided to the host 100 as a logical volume. The external initiator WWPN field 2383 stores information indicating the port number of the externally connected storage apparatus 200.

For example, the volume with the volume ID '1' in the second storage apparatus 200*b* is identified by the host 100 as the logical volume '21'. Furthermore, this volume is externally connected to the first storage apparatus 100*a* with a connection port identified by the port number 'WWPN_S12', and is connected to the first storage apparatus 100*a* via a connection port that is identified by the port number 'WWPN_S21'.

The duplicate data management table 2390 is a table for managing information relating to each of the data stored in the storage apparatuses 200 and, as shown in FIG. 10, comprises a pool ID field 2391, a volume ID field 2392, a block address field 2393, a hash value field 2394, and a pointer field 2395, or the like. The pool ID field 2391 stores information identifying the pools to which each of the data belong. FIG. 10 shows information stored in the duplicate data management table 2390 which is stored respectively in each memory of the first storage apparatus 200*a*, the second storage apparatus 200*b*, and the third storage apparatus 200*c*.

The volume ID field 2392 stores information identifying volumes to which each of the data belong. The block address field 2393 stores the start position of the block address of each of the data. The hash value field 2394 stores the hash values of each of the data. The pointer field 2395 stores, if there is other duplicate data, information indicating the location where the duplicate data is stored.

For example, if data which starts at block address '0' of the volume with the volume ID '1' which belongs to the pool ID '0' of the first storage apparatus 200*a* is a duplicate of data starting at block address '0' of volume '0' of pool '0', '0:0:0' is stored in the pointer field 2395. Furthermore, in cases where no other duplicate data exists, a value 'NULL' is stored.

Figure 11:
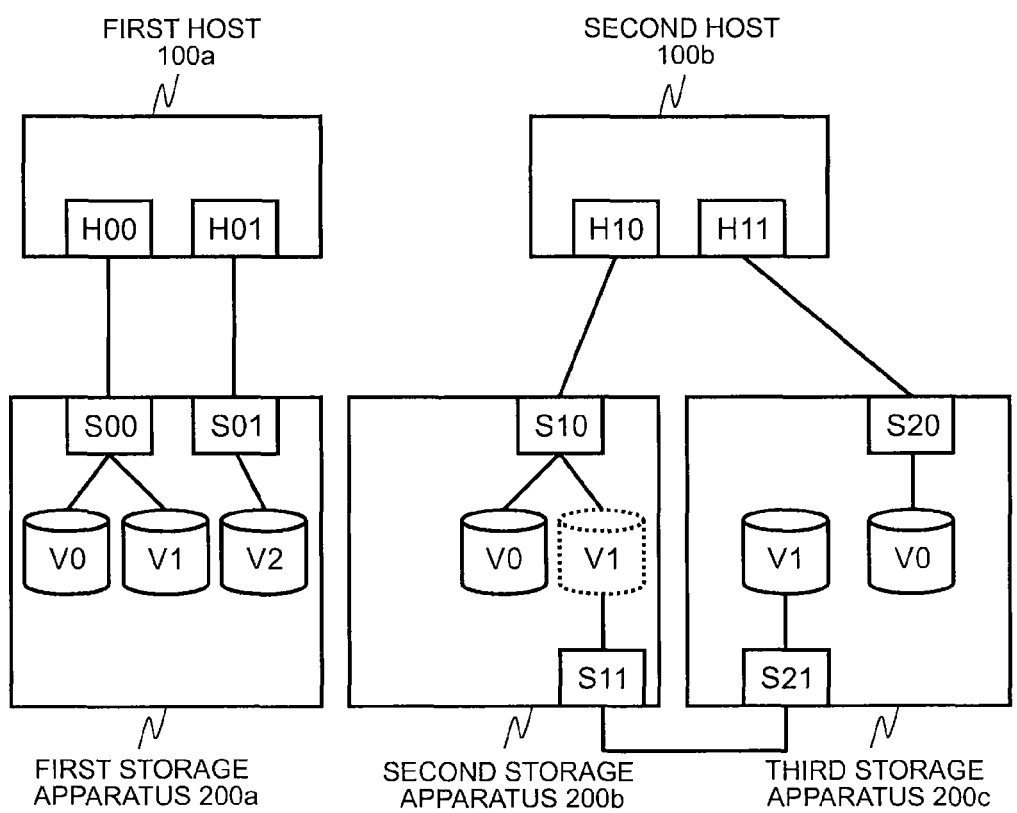
FIG. 11 is a conceptual view of the connected relationships between volumes and ports according to the first embodiment.

The connected relationships between the volumes and ports of the hosts 100 and storage apparatuses 200 according to this embodiment will be described here with reference to FIG. 11. In FIG. 11, ports of each device are shown using the port suffices, namely, 'H00', 'H01', and so on. For example, the first host 100*a* comprises ports 'H00' and 'H01' and the second host 100*b* comprises 'H10' and 'H11'. Furthermore, the first storage apparatus 200*a* comprises ports 'S00' and 'S01', and internal volumes 'V0', 'V1', and 'V2'. In addition, the internal volume 'V0' and 'V1' are connected to the first host 100*a* via port 'S00' and the internal volume 'V2' is connected to the first host 100*a* via the port 'S01'.

Further, the second storage apparatus 200*b* comprises a port 'S10' for connecting to the second host 100*b* and a port 'S11' for connecting to the third storage apparatus 200*c*. Furthermore, the second storage apparatus 200*b* comprises an internal volume 'V0' and an external volume 'V1'. In addition, the internal volume 'V0' and external volume 'V1' are connected to the second host 100*b* via port 'S10'. Furthermore, the external volume 'V1' is connected to the third storage apparatus 200*c* via the port S11.

Further, the third storage apparatus 200*c* comprises a port 'S20' for connecting to the second host 100*b* and a port 'S21' for connecting to the second storage apparatus 200*b*. Furthermore, the third storage apparatus 200*c* comprises internal volumes 'V0' and 'V1'. In addition, the internal volume 'V0' is connected to the second host 100*b* via port 'S20' Furthermore, the internal volume 'V1' is connected to the second storage apparatus 200*b* via the port 'S21'.

As a result of being externally connected to the third storage apparatus 200*c*, the second storage apparatus 200*b* is capable of handling the data stored in volume 'V1' in the third storage apparatus 200*c* as if the second storage apparatus 200*b* itself were storing this data. In cases where data is read/written by the second host 100*b* to the volume 'V11 of the second storage apparatus 200*b* via the port S10, in reality data is written to the volume 'V1' of the third storage apparatus 200*c* and data stored in the volume 'V1' is read and stored.

(2-2-3) Management Server Configuration

Figure 12:
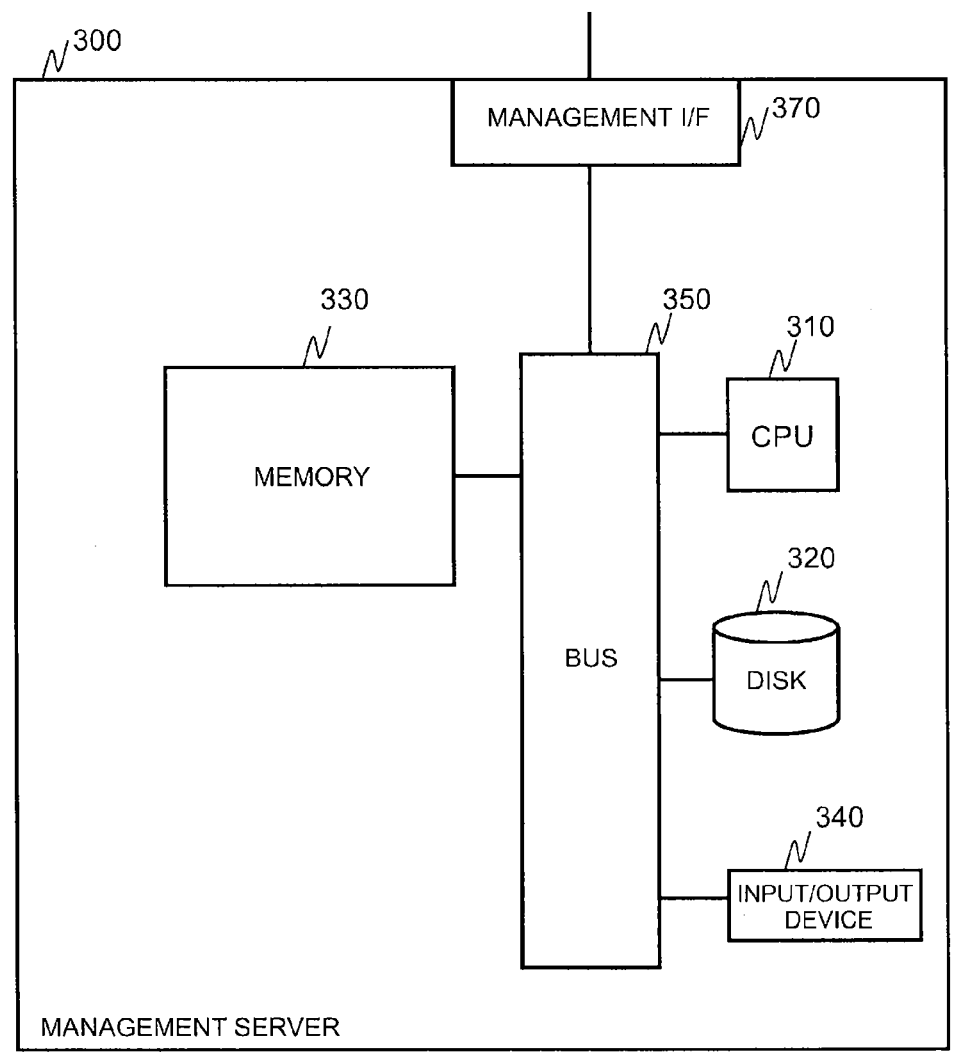
FIG. 12 is a block diagram showing a hardware configuration of a management server according to the first embodiment.

The hardware configuration of the management server 300 will be described next with reference to FIG. 12. As shown in FIG. 12, the management server 300 comprises a CPU 310, a disk 320, a memory 330, an input/output device 340, a bus 350, and a management I/F 370 and so forth.

The CPU 310 functions as an arithmetic processing unit and controls the operation of the management server 300 as a whole in accordance with various programs and computational parameters and the like which are stored in the memory 330. The main program stored in the memory 330 will be described in detail subsequently.

The disk 320 is a device for storing data which, for example, comprises a hard disk drive (HDD). The input/output device 340 comprises an input device such as a keyboard, switch, pointing device, or microphone, and an output device such as a monitor display or speaker, and the like.

The bus 350 has a function for interconnecting each of the devices which the management server 300 comprises, and comprises, for example, a host bus that comprises a CPU bus or the like, a bridge, and so on. The management I/F 370 is an interface which is connected to the host 100, the storage apparatus 200, and the backup server 400 via the LAN 700 and which sends and receives various information to/from the management server 300.

Figure 13:
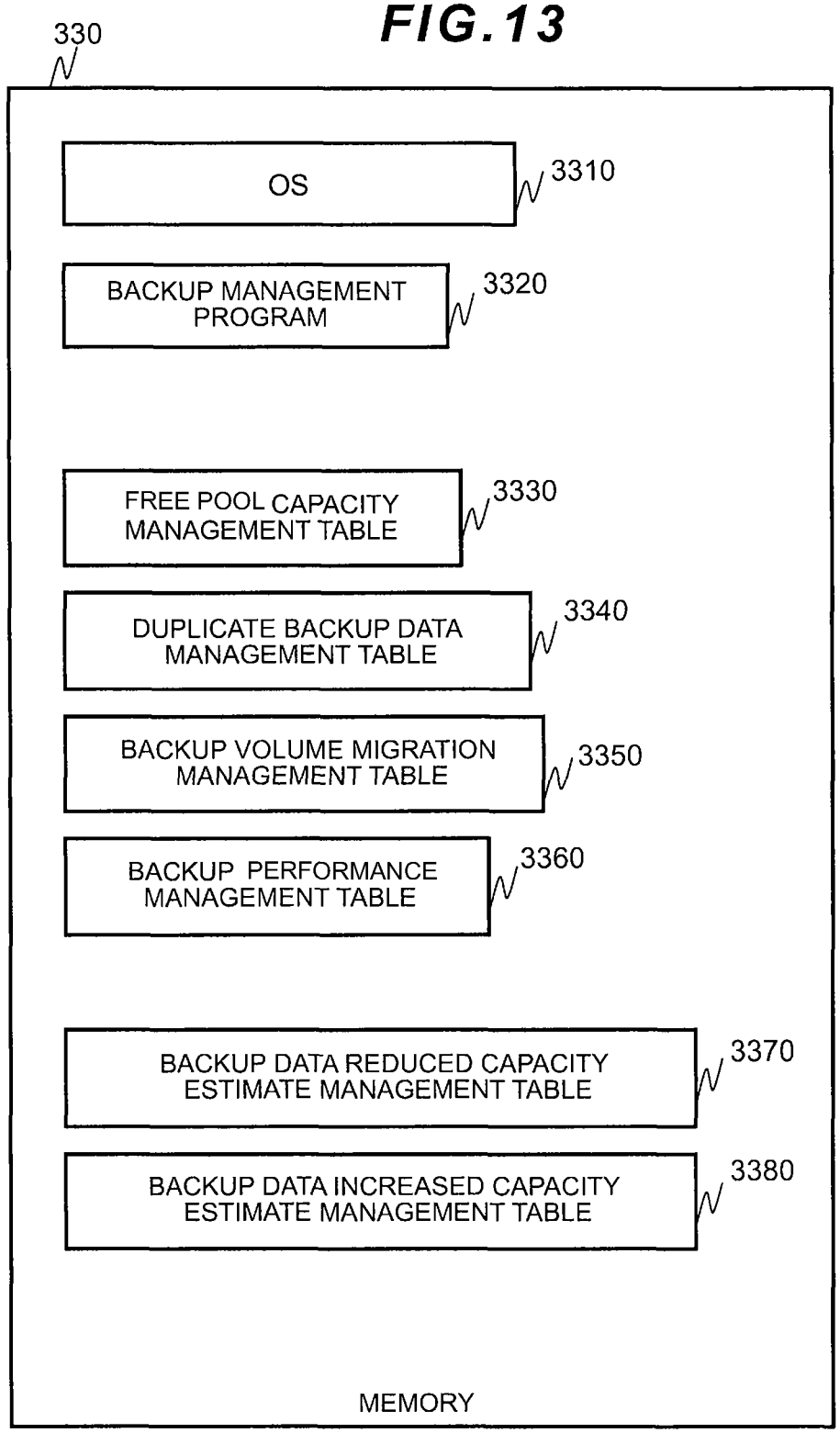
FIG. 13 is a block diagram showing a software configuration of the management server according to the first embodiment.

The programs and tables which are stored in the memory 330 will be described next with reference to FIG. 13. The memory 330 stores an OS 3310, a backup management program 3320, a free pool capacity management table 3330, a duplicate backup data management table 3340, a backup volume migration management table 3350, a backup performance management table 3360, a backup data reduced capacity estimate management table 3370, and a backup data increased capacity estimate management table 3380, and so on, for example.

The OS 3310 is a program for managing the whole management server 300 and the backup management program 3320 is a program for overall management of backup processing.

The free pool capacity management table 3330 is a table for managing the free capacity of each pool contained in each storage apparatus, and comprises, as shown in FIG. 14, a storage ID field 3331, a pool ID field 3332, and a free capacity field 3333, and the like.

The storage ID field 3331 stores information identifying storage apparatuses 200 which are connected to the management server 300. The pool ID field 3332 stores information identifying each of the pools contained in each of the storage apparatuses 200.

As shown in FIG. 14, the storage ID field 3331 stores the IDs '0', '1', and '2' corresponding to each of the storage apparatuses 200. According to this embodiment, hereinafter the storage ID of the first storage apparatus 200*a* is described as '0', the storage ID of the second storage apparatus 200*b* is described as '1', and the storage ID of the third storage apparatus 200*c* is described as '2'. The free capacity field 3333 stores information showing the free capacity of each pool.

The duplicate backup data management table 3340 is a table for centrally managing information relating to all of the data stored in each of the storage apparatuses connected to the management server 300 and, as shown in FIG. 15, comprises a No field 3341, a storage ID field 3342, a pool ID field 3343, a volume ID field 3344, a block address field 3345, a hash value field 3346, and a pointer field 3347, or the like.

The No field 3341 stores the serial numbers of each of the data. The serial numbers of each of the data are numbers that are uniquely identified by the management server 300. The storage ID field 3342 stores information identifying storage apparatuses 200 which are connected to the management server 300. The pool ID field 3343 stores information identifying each of the pools contained in each of the storage apparatuses 200. The volume ID field 3344 stores information identifying volumes in each storage apparatus 200. The block address field 3345 stores the start position of the block address of each of the data. The hash value field 3346 stores the hash values of each of the data.

The pointer field 3347 stores, if there is other duplicate data among the data stored in the duplicate backup data management table 3340, information indicating the location where the duplicate data is stored. The pointer field 3347 stores the serial numbers of the duplicate data (numbers stored in the No field 3341), for example.

The backup volume migration management table 3350 is a table for temporarily storing data which is updated through volume migration before volume migration is executed and, as shown in FIG. 16, the configuration of the backup volume migration management table 3350 is the same as that of the duplicate backup data management table 3340, and hence a detailed description is omitted here.

The backup performance management table 3360 is a table for storing backup-related information such as the backup processing time and, as shown in FIG. 17, the backup performance management table 3360 comprises a backup server ID field 3361, a bandwidth field 3362, a time limit field 3363, a backup storage ID field 3364, a backup capacity field 3365, and a backup capacity estimate field 3366, and the like.

The backup server ID field 3361 stores information identifying the backup servers 400. The bandwidth field 3362 stores information on the bandwidth of the network connecting the storage apparatuses 200 and the backup servers 400. The time limit field 3363 stores time limit information for backup processing. The backup storage ID field 3364 stores information identifying the storage apparatus 200 which is the backup target. The backup capacity field 3365 stores information on the current backup capacity before volume migration. The backup capacity estimate field 3366 stores the estimated result of the backup capacity after volume migration.

Note that the backup server ID field 3361, the bandwidth field 3362, the time limit field 3363, and the backup storage ID field 3364 stores information determined beforehand according to user inputs and the like.

The backup data reduced capacity estimate management table 3370 is a table for managing which of the volumes are migration targets among the plurality of volumes in the storage apparatuses 200 and, as shown in FIG. 18, comprises a migration source volume ID field 3371, a backup volume ID field 3372, and a backup capacity estimate field 3373, and the like.

The migration source volume ID field 3371 stores identification information on the volumes which are to be the migration source among the plurality of volumes in the storage apparatuses 200. The backup volume ID field 3372 stores identification information on the volumes which are to be backup targets. The backup capacity estimate field 3373 stores the estimated result of the volume backup capacity configured in the backup volume ID field 3372. The backup capacity estimate result will be described in detail subsequently.

The backup data increased capacity estimate management table 3380 is a table for managing the backup capacity in a case where a migration target volume is added and, as shown in FIG. 19, comprises a migration destination storage ID field 3381 and a backup capacity estimate field 3382, and the like.

The migration destination storage ID field 3381 stores information identifying the storage apparatus 200 which is to be the migration destination of the migration target volumes. Volumes which are to serve as migration targets are added to the backup capacity estimate field 3382, in which information is stored indicating the backup capacity in cases where duplicate removal processing is executed.

(2-2-4) Backup Server Configuration

Figure 20:
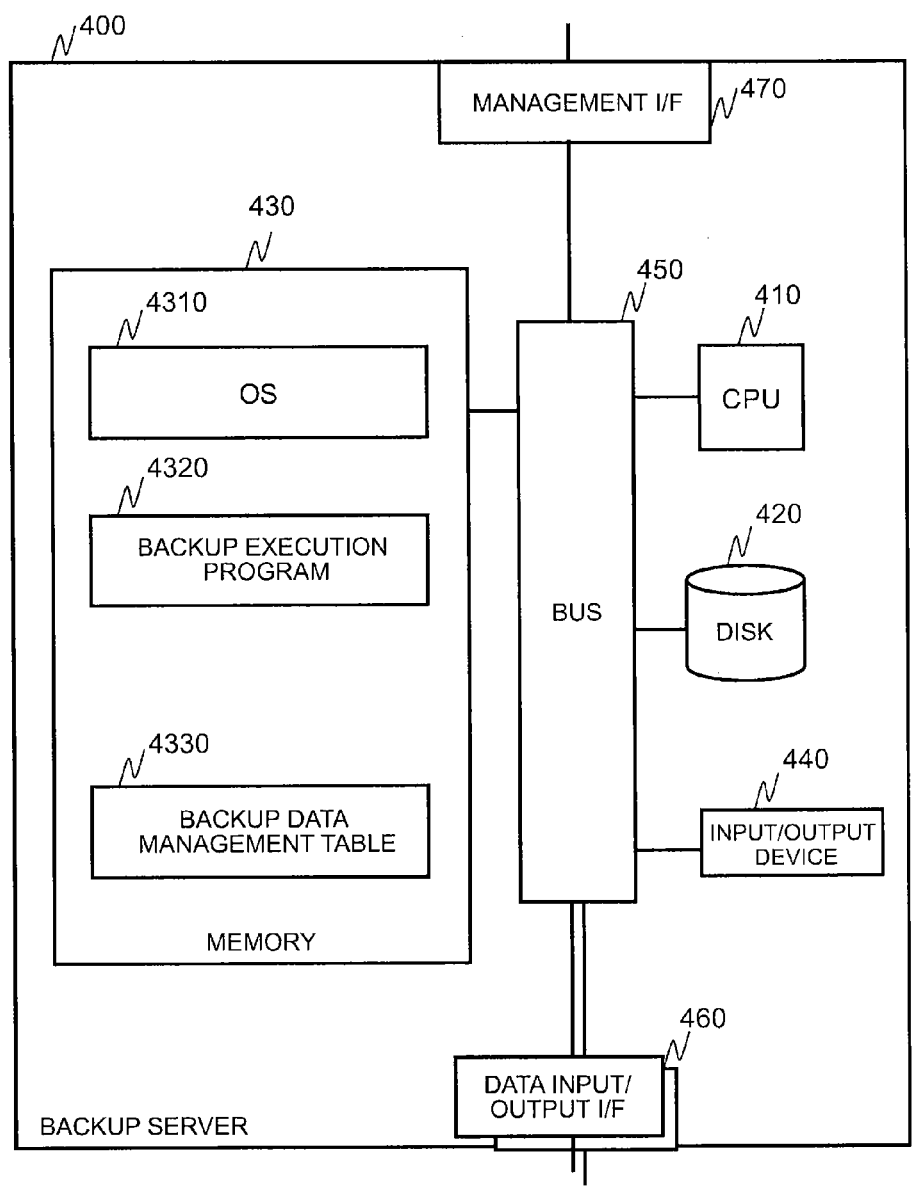
FIG. 20 is a block diagram showing a hardware configuration and software configuration of a backup server according to the first embodiment.

The hardware configuration and software configuration of the backup servers 400 will be described next with reference to FIG. 20. As shown in FIG. 20, the backup servers 400 comprise a CPU 410, a disk 420, a memory 430, an input/output device 440, a bus 450, a data input/output I/F 460 and a management I/F 470 and so forth.

The CPU 410 functions as an arithmetic processing unit and controls the operation of the backup servers 400 as a whole in accordance with the OS 4310 which is stored in the memory 430. In addition, the CPU 410 executes data backups according to the backup execution program 4320. The backup data management table 4330 stores data backup-related information such as when particular data was backed up and so on.

The disk 420 is a device used for storing data which, for example, comprises a hard disk drive (HDD), and stores backed up data. The input/output device 440 comprises an input device such as a keyboard, switch, pointing device, or microphone, and an output device such as a monitor display or speaker, or the like.

The bus 450 has a function for interconnecting each of the devices which the backup server 400 comprises, and comprises, for example, a host bus that comprises a CPU bus or the like, a bridge, and so on. The data input/output I/F 460 is an interface which is connected to the storage apparatus 200 via a SAN 600 and which is for sending and receiving various information to/from the storage apparatuses 200. In addition, the management I/F 470 is an interface which is connected to the management server 300 via the LAN 700 and which is for sending and receiving various information to/from the management server 300.

(2-3) Details of Operation of Each Device

Details of the operation of each device in the computer system 1 will be provided next with reference to FIGS. 21 to 24. Details of the operation of the management server 300 for executing the processing characterizing this embodiment will be provided hereinbelow in particular. Foremost, data backup processing by the backup management program 3320 of the management server 300 will be described with reference to FIG. 21. First, the backup management program 3320 is run under the control of the CPU 310 of the management server 300. Thereafter, the backup management program 3320 is connected to the management server 300 and updates the free pool capacity management table 3330, the duplicate backup data management table 3340, the backup volume migration management table 3350, and the backup performance management table 3360 of each storage apparatus 200 which is a backup target (S101). More specifically, the backup management program 3320 acquires, from each of the storage apparatuses 200, the latest information such as the total capacity and free capacity of the pool, and the hash values of each of the data, and updates the data stored in each table to the latest information.

Thereafter, the backup management program 3320 determines whether the processing of steps S103 to S104 (described subsequently) has been executed for all the storage apparatuses 200 which are backup targets (S102).

If it is determined in step S102 that the processing of steps S103 to S104 has not been executed for all the storage apparatuses 200 which are backup targets, the backup management program 3320 determines whether or not the estimated backup completion time is less than the time limit (S103). More specifically, the backup management program 3320 refers to the bandwidth field 3362, time limit field 3363, and backup capacity estimate field 3366 of the backup performance management table 3360, and determines whether or not the estimated backup completion time of the storage apparatus 200 being targeted lies within the time limit.

The estimated backup completion time is calculated from the backup capacity and bandwidth. For example, if we refer to the backup performance management table 3360 shown in FIG. 17, among the storage apparatuses 200, the first storage apparatus 200a with the storage ID '0' has a backup capacity of '35 GB', while the bandwidth is '10 GB/H (gigabyte/hour). In this case, the estimated backup completion time is calculated using the following equation.

$$\text{BACKUP CAPACITY/BANDWIDTH} = \text{EST. BACKUP COMPLET. TIME} \qquad [\text{Math.1}]$$

$$35\ GB/10\ GB/H = 3.5H$$

Furthermore, the backup time limit is the time which is stored in the time limit field 3363 of the backup performance management table 3360 and the time limit is '3H'. Hence, the storage apparatus has an estimated backup completion time of '3.5H' which exceeds the required backup completion time '3H'.

Similarly, the estimated backup completion time of the second storage apparatus 200b with the storage ID '1' is '0.7H' and lies within the time limit of '3H', the estimated backup completion time of the third storage apparatus 200c with the storage ID '2' is '1.3H' and the time limit is '3H'. It is therefore clear that the storage apparatus, among the first to third storage apparatuses, for which the estimated backup completion time does not lie within the time limit, is the first storage apparatus 200a. Therefore, when it is necessary to migrate either of the plurality of volumes in the first storage apparatus 200a to the second storage apparatus 200b or third storage apparatus 200c, migration target volume determination processing (step S104), described subsequently, is executed.

If it is determined in step S103 that the estimated backup completion time does not lie within the time limit, the backup management program 3320 executes migration target volume determination processing (S104).

Here, details of the migration target volume determination processing in step S104 will be described with reference to FIG. 22. First, the backup management program 3320 updates the backup reduced capacity estimate management table 3370 (S201). More specifically, the backup management program 3320 calculates the backup capacity in cases where one volume is eliminated from the volumes in the storage apparatus 200, and stores the backup capacity in the backup capacity estimate field 3373 of the backup reduced capacity estimate management table 3370.

As mentioned earlier, in this embodiment, since the migration target volume determination processing is executed on the volumes in the first storage apparatus 200a, in step S201 the backup management program 3320 calculates the backup capacity estimate for the volumes of the first storage apparatus 200a. For example, if a target migration-source volume is volume '0', the backup management program 3320 calculates the backup capacities of volumes '1' and '2' excluding volume '0'.

For example, as shown in the backup reduced capacity estimate management table 3370 of FIG. 18, three volumes with the volume IDs '0', '1', and '2' are installed in the first storage apparatus 200a, the backup capacity '24 GB' of volumes '1' and '2'excluding the volume ID '0', is calculated. Likewise, the backup capacity '29 GB' of volumes '0' and '2' excluding the volume ID '1' and the backup capacity '11 GB' of volumes '0' and '1' excluding the volume ID '2', is calculated.

Thereafter, the backup management program 3320 determines whether or not the processing of steps S203 to S207 has been executed for all volumes which are migration-source candidates (S202). If it is determined in step S202 that the processing of steps S203 to S209 has not been executed for all the volumes which are migration-source candidates, the backup management program 3320 updates the backup increased capacity estimate management table 3380 (S203).

In step S203, the backup management program 3320 calculates the backup capacity in cases where one volume in the first storage apparatus 200a is migrated to the second storage apparatus 200b or the third storage apparatus 200c, and stores the backup capacity in the backup capacity estimate field 3382 of the backup increased capacity estimate management table 3380. For example, as shown in FIG. 19, if the volume '0' of the first storage apparatus 200a which is the migration source is migrated to the second storage apparatus 200b, the backup capacity estimate is calculated to be '9 GB'. Furthermore, if the volume '0' is migrated to the third storage apparatus 200c, the backup capacity estimate is calculated to be '20 GB'.

Thereafter, the backup management program 3320 determines whether or not the processing of step S205 has been executed for all the storage apparatuses 200 which are migration destination candidates (S204). More specifically, if, in step S202, the processing has been executed for volumes in the first storage apparatus 200a, all the storage apparatuses 200 which are migration destination candidates are the storage apparatuses excluding the first storage apparatus 200a, namely the second storage apparatus 200b and third storage apparatus 200c.

Thereafter, if it is determined in step S204 that the processing of step S205 has not been executed for all the storage apparatuses 200 which are migration destination candidates, the backup management program 3320 executes migration destination storage apparatus determination processing (S205).

Figure 23:
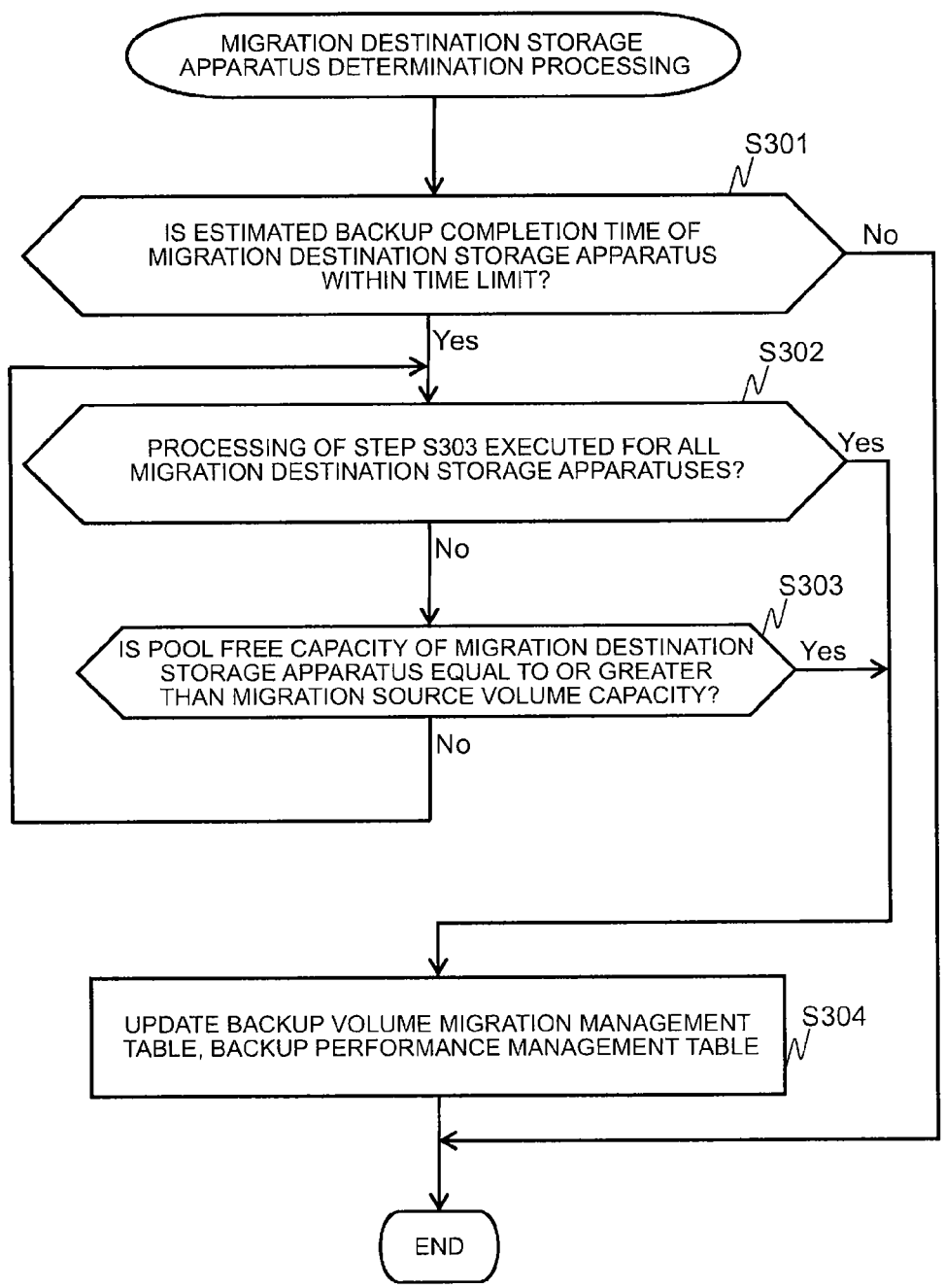
FIG. 23 is a flowchart showing migration destination storage apparatus determination processing according to the first embodiment.

Here, details of the migration destination storage apparatus determination processing will be described with reference to FIG. 23. First, the backup management program 3320 determines whether or not the estimated backup completion time for the storage apparatuses 200 which are migration destinations lies within the time limit (S301). More specifically, the backup management program 3320 refers to the bandwidth field 3362 and the backup capacity field 3365 of the backup performance management table 3360 shown in FIG. 17 to calculate the estimated backup completion time of the storage apparatus 200 selected as the migration destination. Thereafter, the backup management program 3320 refers to the time limit field 3363 [for the storage apparatus] selected as the migration destination and determines whether or not the estimated backup completion time lies within the time limit. As mentioned earlier, the estimated backup completion time lies within the time limit for both the second storage apparatus 200b and third storage apparatus 200c.

Thereafter, if it is determined in step S301 that the estimated backup completion time for the storage apparatuses 200 which are migration destinations lies within the time limit, the backup performance management program 3320 determines whether or not the processing of step S303 has been executed for all the storage apparatuses which are migration destinations (S302). Furthermore, if it is determined in step S301 that the estimated backup completion time for the storage apparatuses 200 which are migration destinations does not lie within the time limit, the backup performance management program 3320 ends the migration destination storage apparatus determination processing.

If, following step S302, it is determined that the processing of step S303 has not been executed for all the storage apparatuses 200 which are to be migration destinations, the backup performance management program 3320 determines whether or not the free pool capacity of the storage apparatuses 200 which are the migration destinations is equal to or more than the migration source volume capacity (S303). Furthermore, if it is determined in step S302 that the processing of step S303 has been executed for all the storage apparatuses 200 which are migration destinations, the backup performance management program 3320 executes the processing of step S304.

In specific terms, in step S303, the backup management program 3320 refers to the free pool capacity management table 3330 of FIG. 14 and acquires the free pool capacity of the second storage apparatus 200b or third storage apparatus 200c which is the migration destination. Thereafter, the backup management program 3320 compares the free pool capacity of the acquired second storage apparatus 200b or third storage apparatus 200c with the capacity of the volume serving as the migration source. If, as a result of the comparison, it is determined that the free pool capacity of the second storage apparatus 200b or third storage apparatus 200c which is the migration destination is equal to or more than the migration source volume capacity, the backup management program 3320 executes the processing of step S304.

In step S304, the backup management program 3320 updates the backup volume migration management table 3350 and the backup performance management table 3360 (S304). The backup management program 3320 temporarily records, among the data contained in the migration target volume, the updated data in the backup volume migration management table 3350. Furthermore, the backup management program 3320 updates information in the backup capacity field 3365 and information in the backup capacity estimate field 3366 of the backup performance management table 3360 in cases where the migration target volume is migrated to the second storage apparatus 200b or the third storage apparatus 200c which is the migration destination.

Returning to FIG. 22, if it is determined in step S204 that the migration destination storage apparatus determination processing of step S205 has been executed for all the storage apparatuses 200 which are migration destination candidates, the backup management program 3320 determines whether or not the estimated backup completion time, of the migration source storage apparatus (backup volume migration source storage apparatus) 200 which comprises the migration source volume, lies within the time limit (S206).

As described earlier, in step S304, the backup performance management table 3360 stores the backup capacity or the like in a case where the migration target volume is migrated. Therefore, in step S206, the backup management program 3320 calculates the estimated backup completion time from the backup capacity 3365 of the updated backup performance management table 3360. Thereafter, the backup management program 3320 determines whether or not the estimated backup completion time thus calculated lies within the time limit. As mentioned earlier, in this embodiment, since the volume of the first storage apparatus 200a is migrated, the backup management program 3320 calculates the estimated backup completion time for the first storage apparatus 200a when migrating a volume, and determines whether or not the estimated backup completion time lies within the time limit of '3H'.

If, in step S206, the estimated backup completion time of the backup volume migration source storage apparatus 200 lies within the time limit, the backup management program 3320 ends the processing. It is clear that if, in step S206, the estimated backup completion time of the first storage apparatus 200a when migrating a volume lies within the time limit '3H', the backup processing time is reduced as a result of the volume migration.

Furthermore, if the estimated backup completion time of the backup volume migration source storage apparatuses 200 does not lie within the time limit, the backup management program 3320 updates the backup reduced capacity estimate management table 3370 (S207). In step S207, the backup management program 3320 calculates the backup capacity except for those volumes other than those already subjected to the processing of steps S203 to S207.

Returning to FIG. 21, after determining the migration target volume and the migration destination storage apparatus 200, the backup management program 3320 executes backup volume migration processing on, among the storage apparatuses 200, the first storage apparatus 200a for which the estimated backup completion time does not lie within the time limit (S105). According to this embodiment, hereinafter the migration target volume will be described as volume 'V2' of the first storage apparatus 200a and the migration destination storage apparatus as the second storage apparatus 200c. Here, details of the backup volume migration processing in step S105 will be described with reference to FIG. 24.

Figure 24:
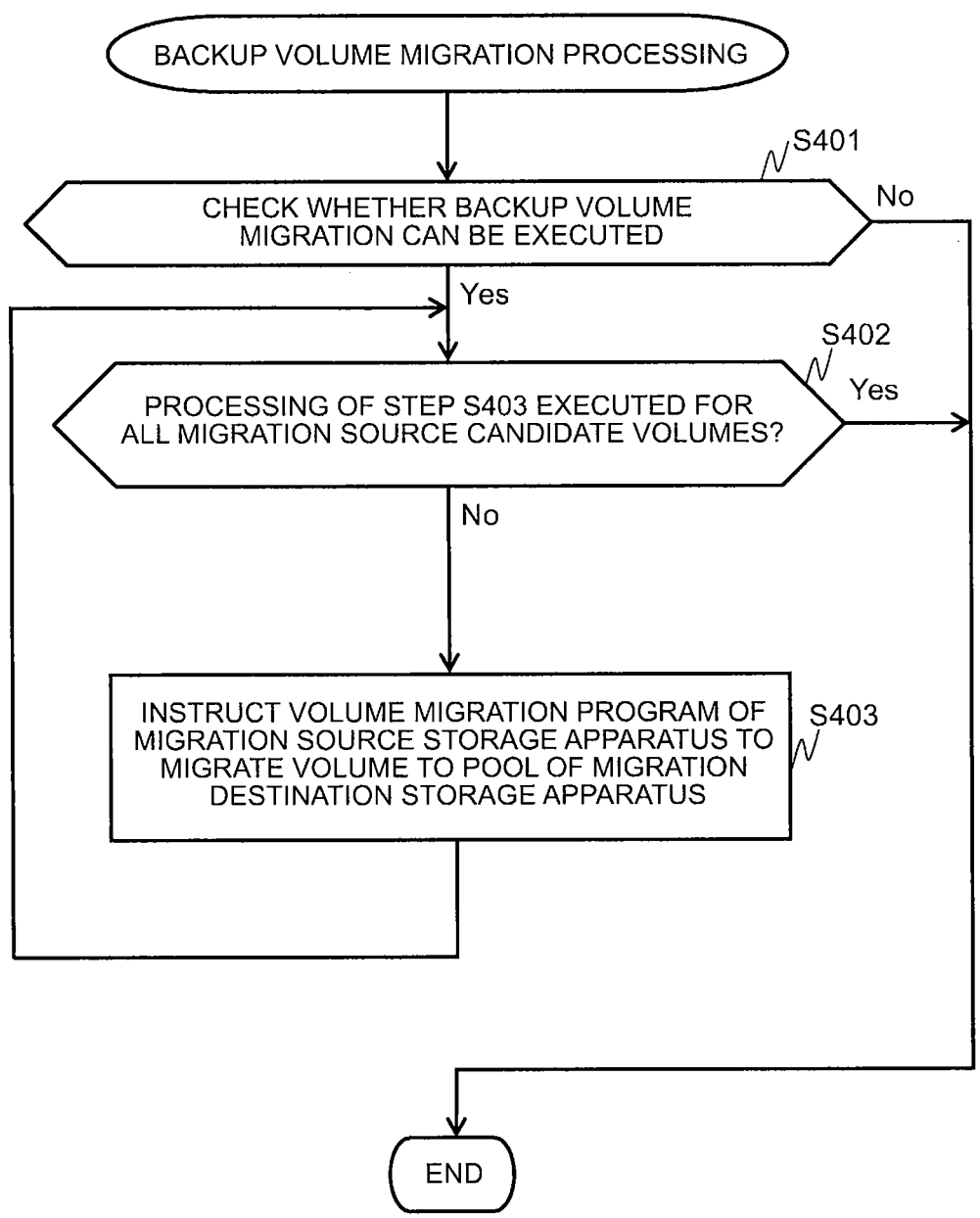
FIG. 24 is a flowchart showing backup volume migration processing according to the first embodiment.

As shown in FIG. 24, the backup management program 3320 first checks whether it is possible to execute migration of the backup volume (S401). For example, the confirmation screen shown in FIG. 25 may be displayed on the display device of the management server 300 to enable a user input. As shown in FIG. 25, the display screen 50 displays a migration target volume (migration source) and a migration destination storage apparatus (migration destination) for which the backup time lies within the time limit on the basis of the processing result of the aforementioned migration target volume determination processing and so forth. For example, the display screen 50 displays the migration source volume ID, the storage ID and pool ID, and the migration destination volume ID, the storage ID and pool ID.

Furthermore, the change in capacity of backup data may also be displayed by migrating the backup volume. For example, the display screen 50 displays the result of estimating the backup execution time before and after migrating the backup volume as a result of migrating the target volume Furthermore, items for electing whether or not to execute backup volume migration such as an 'OK' or 'Cancel' display are displayed to prompt a user input.

Thereafter, the backup management program 3320 determines whether or not the processing of step S403 has been executed for all migration target volumes (migration-source candidate volumes) (S402). If it is determined in step S402 that the processing of step S403 has not been executed for all the volumes which are migration targets, the backup management program 3320 instructs the volume migration program 2330 of the migration source storage apparatus 200 to perform volume migration to the pool of the migration destination storage apparatus 200 (S403). In step S403, the migration source storage apparatus 200 which has been instructed by the management server 300 to perform volume migration, is emphasized as the migration destination storage apparatus and executes path generation which is required for volume data migration and for data inputs/outputs.

Returning to FIG. 21, the backup management program 3320 determines, after executing the backup volume migration processing of step S105, whether or not the processing of step S107 has been executed for all backup servers (S106). If it is determined in step S106 that the processing of step S107 has not been executed for all of the backup servers, the backup management program 3320 instructs all the backup servers to execute the backup execution program 4320 (see, e.g., FIG. 20) to perform data backup (S107).

Figure 26:
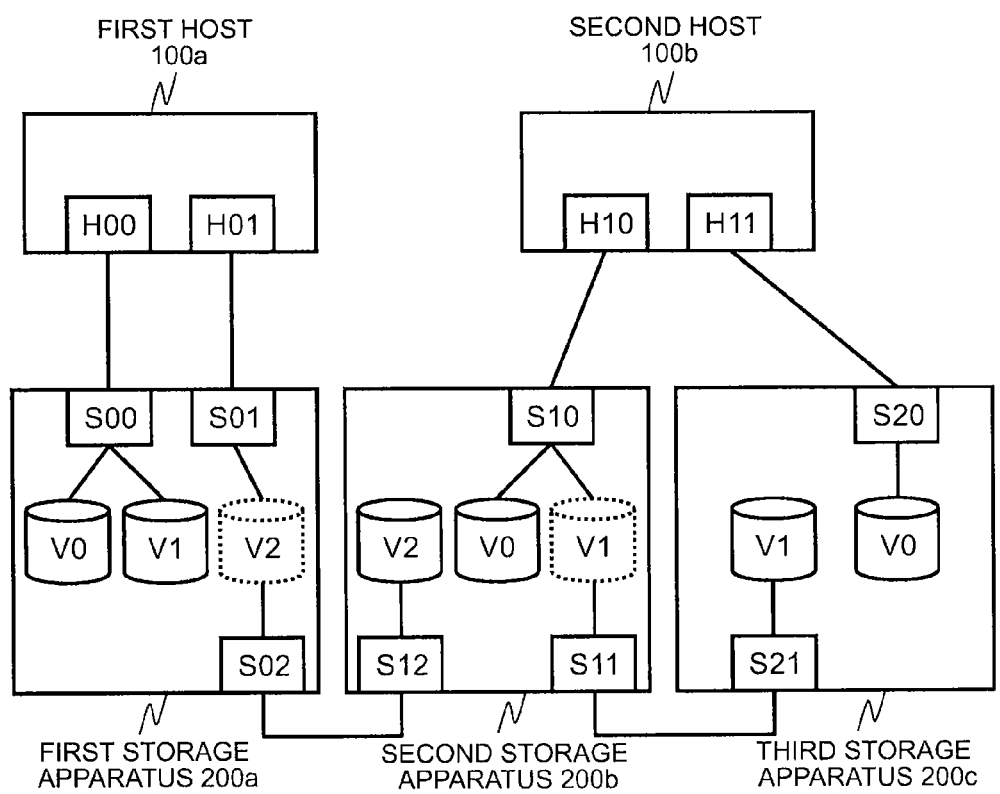
FIG. 26 is a conceptual view of the connected relationships between volumes and ports according to the first embodiment.

Details of the operation of the management server 300 were described hereinabove. FIG. 26 shows the connected relationships between the volumes and ports of the hosts 100 and storage apparatuses 200 respectively in a case where the volume 'V2' of the first storage apparatus 200a is migrated by executing the foregoing processing. As shown in FIG. 26, volume 'V2' of the first storage apparatus 200a is migrated to the second storage apparatus 200b and the first storage apparatus 200a and second storage apparatus 200b are externally connected, which makes FIG. 26 different from FIG. 11 which shows the configuration before volume migration.

In reality, data stored in volume 'V2' of the first storage apparatus 200a is migrated to the second storage apparatus 200b. Furthermore, the first storage apparatus 200a and second storage apparatus 200b are externally connected and volume 'V2' of the first storage apparatus 200a is associated with volume 'V2' of the second storage apparatus 200b. As a result, data can be seen by the first host 100a as if the data were stored in volume 'V2' of the first storage apparatus 200a. That is, the first host 100a is provided with volume 'V2' of the first storage apparatus 200a as a virtual volume.

By migrating volume 'V2' of the first storage apparatus 200a to the second storage apparatus 200b and migrating volumes with a low data duplication rate to another storage apparatus in this way, the duplicate removal efficiency can be improved. Furthermore, volumes with a low data duplication rate are migrated to the second storage apparatus 200b with a large free pool capacity to the extent that the backup processing time does not exceed the time limit. As a result, it is possible to shorten the overall backup processing time of the computer system 1 which comprises a plurality of storage apparatuses 200.

(2) Second Embodiment

A second embodiment of the present invention will be described next with reference to FIGS. 27 and 28. The second embodiment differs from the first embodiment in comprising a multipath I/O management program 1330 in a memory 130 of the host 100. A configuration which differs from that of the first embodiment will be described hereinbelow in particular detail, while a detailed description of configurations like those of the first embodiment is omitted.

Figure 27:
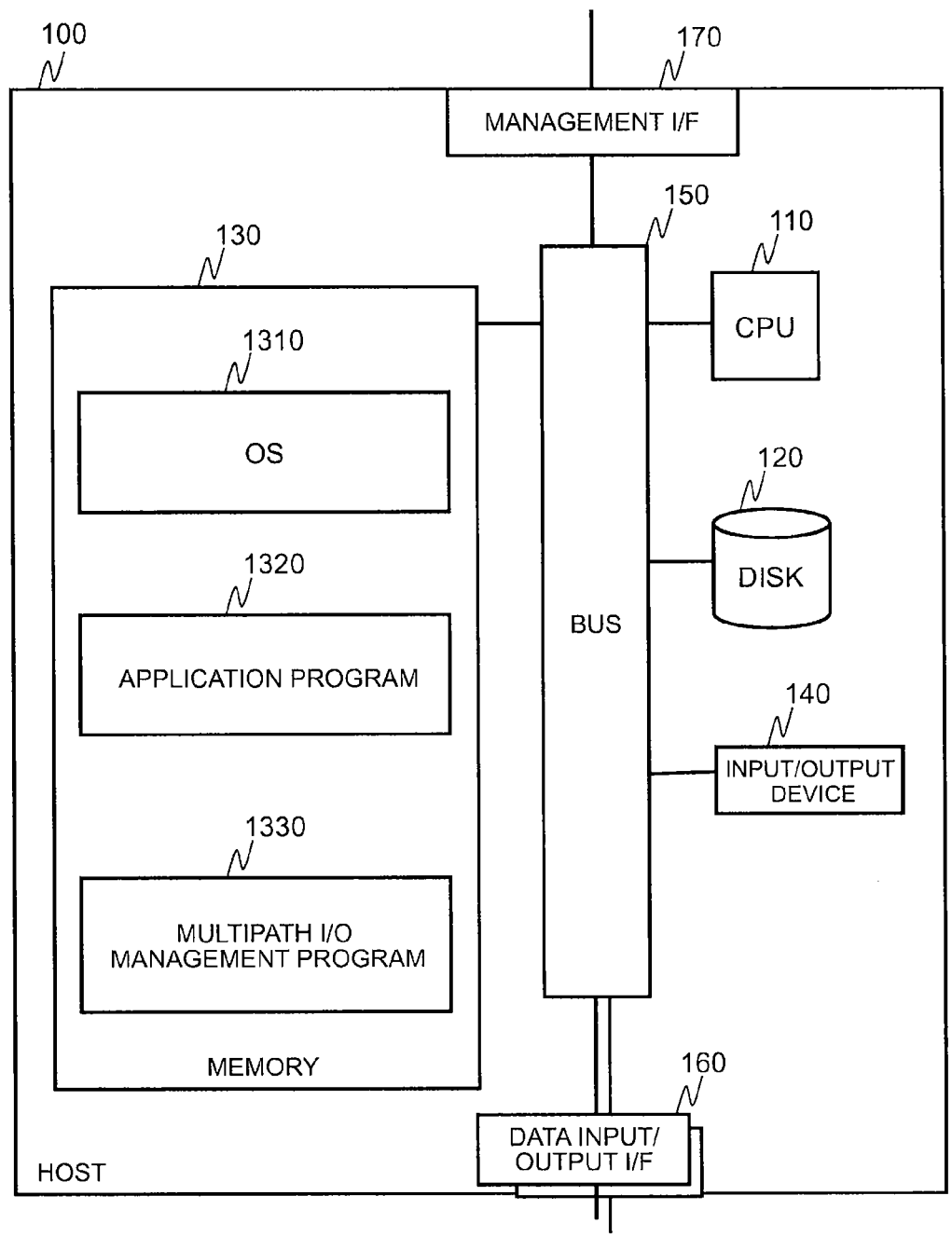
FIG. 27 is a block diagram showing a configuration diagram of a host according to a second embodiment of the present invention.

As shown in FIG. 27, the host 100 according to this embodiment comprises, in the memory 130, in addition to the OS 1310 and the application program 1320, a multipath I/O management program 1330. By changing the data I/O path connection, the multipath I/O management program 1330 is able to change the access path from a volume in the migration source storage apparatus to a volume in another storage apparatus which is a migration destination.

In step S403 of the backup volume processing in FIG. 24, an instruction to migrate a volume to a storage apparatus which is a migration destination is sent by the management server 300 to the migration-source storage apparatus 200. In step S403, if a volume migration instruction is sent to the migration source storage apparatus 200, the volume migration program 2330 of the migration source storage apparatus 200 cooperates with the migration destination storage apparatus and executes data migration. Furthermore, the volume migration program 2330 of the migration source storage apparatus 200 instructs the multipath I/O management program 1330 of the host 100 to change the data I/O access path from the volume of the migration source storage apparatus 200 to the volume of the migration destination storage apparatus.

Figure 28:
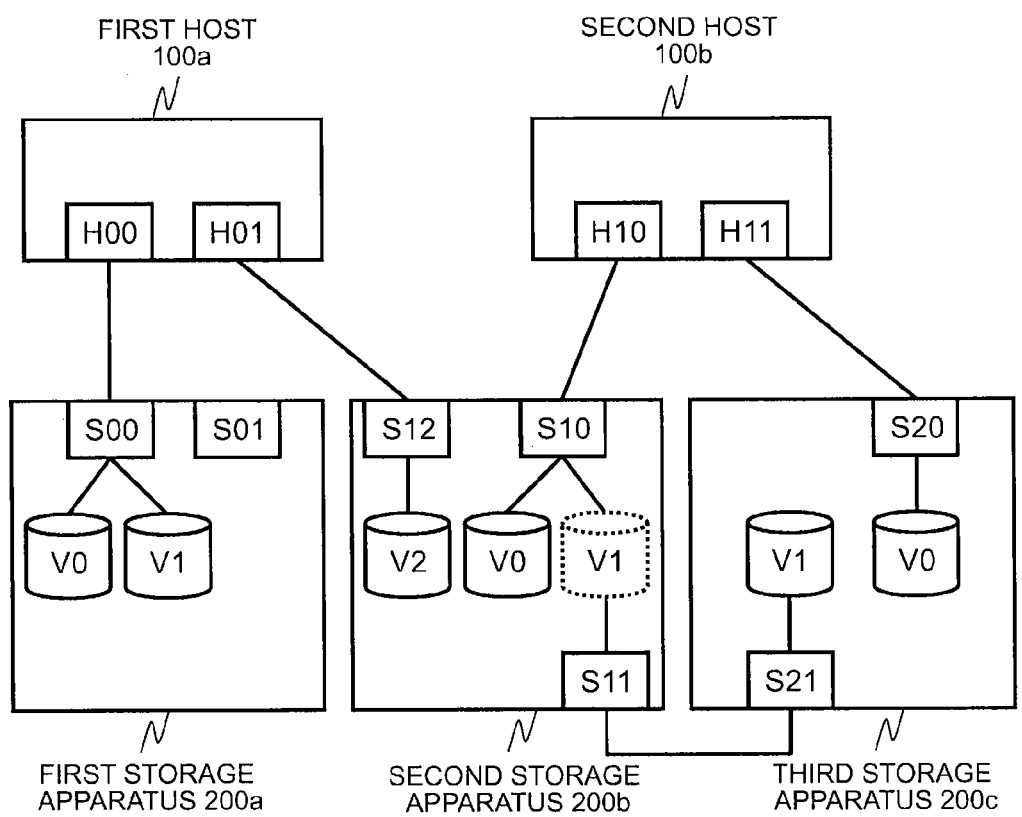
FIG. 28 is a conceptual view of the connected relationships between volumes and ports according to the first embodiment.

FIG. 28 shows the connected relationships between the volumes and ports of the hosts 100 and storage apparatuses 200 respectively in a case where the access path of the first host 100a is changed. As shown in FIG. 28, the data of volume 'V2' in the first storage apparatus 200a is migrated to the second storage apparatus and the access path of the first host 100a is changed from the connection port 'S01' of the first storage apparatus 200a to the connection port 'S12' of the second storage apparatus 200b.

According to this embodiment, after volume migration is executed from the first storage apparatus 200a to the second storage apparatus 200b, the first host 100a is able to access the migrated volume without the first storage apparatus 200a and second storage apparatus 200b being externally connected.

(3) Third Embodiment

A third embodiment of the present invention will be described next with reference to FIGS. 29 and 30. The third embodiment differs from the first embodiment in that, when determining the migration destination storage apparatuses 200, consideration is paid not only to the backup capacity but also to the migration execution time for migrating a volume. Hereinbelow a configuration which differs from that of the first embodiment will be described in particular detail, while a detailed description of configurations like those of the first embodiment is omitted.

As shown in FIG. 29, a new migration execution time estimate field 3383 is added to the backup data increased capacity estimate management table 3380 according to this embodiment. The migration execution time estimate field 3383 stores an execution time for when a volume is migrated.

Figure 22:
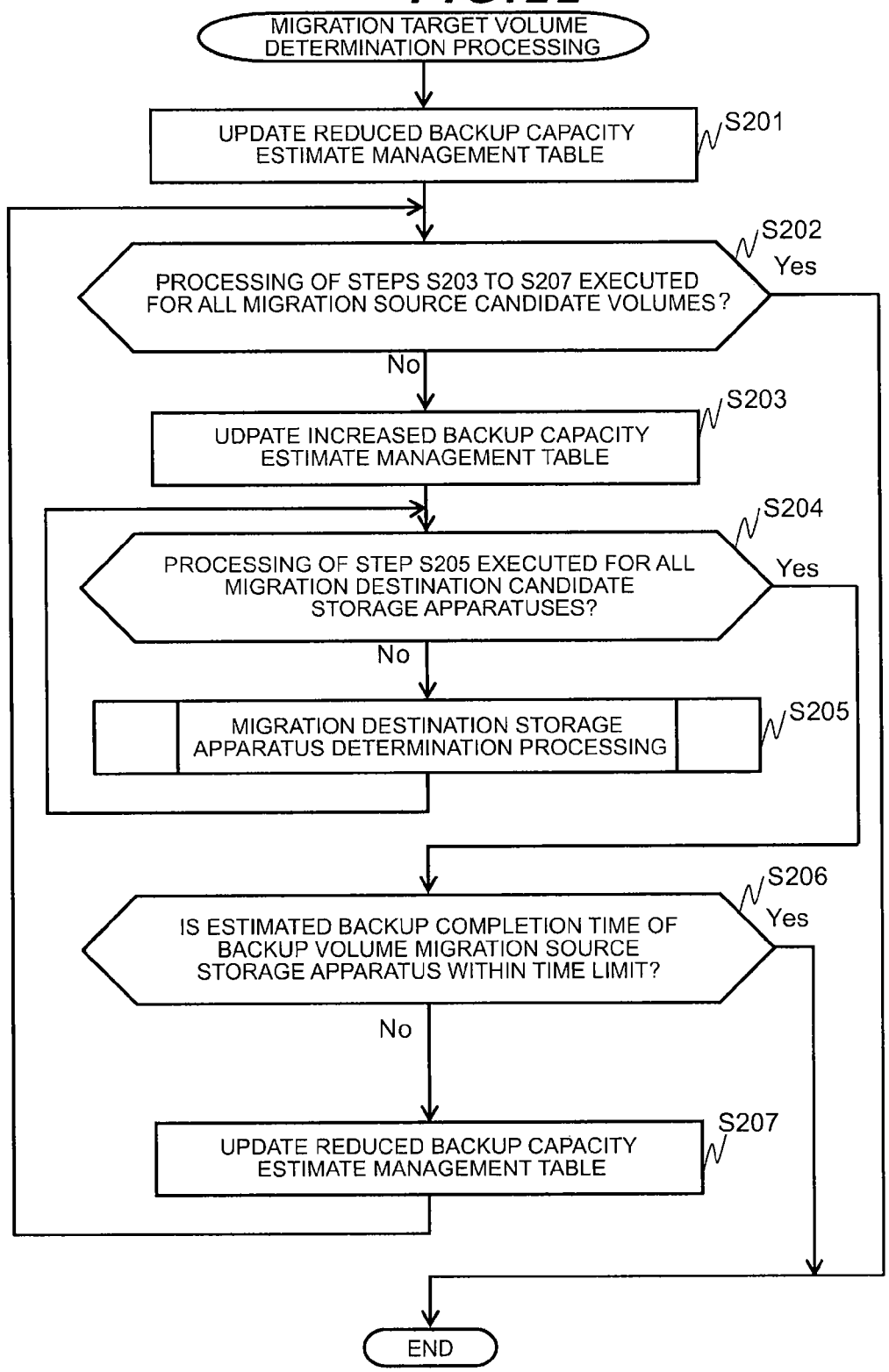
FIG. 22 is a flowchart showing migration target volume determination processing according to the first embodiment.

In step S206 of FIG. 22, the backup management program 3320 calculates the estimated backup completion time from the backup capacity 3365 of the updated backup performance management table 3360, and refers to the migration execution time estimate field 3383 in the backup data increased capacity estimate management table 3380. The backup management program 3320 determines whether not only the estimated backup completion time but also the volume migration execution time lies within the required time for backup completion (time limit).

Furthermore, as shown in FIG. 30, the volume migration execution time may be displayed as the 'migration execution time estimate' item on the confirmation screen 55 for the user. As a result, the user is able to check not only the time taken by the backup processing but also the time for migrating a volume. According to this embodiment, volume migration can be executed so that the backup processing time, which also takes into account the migration execution time, lies within the desired time limit.

(4) Fourth Embodiment

Figure 31:
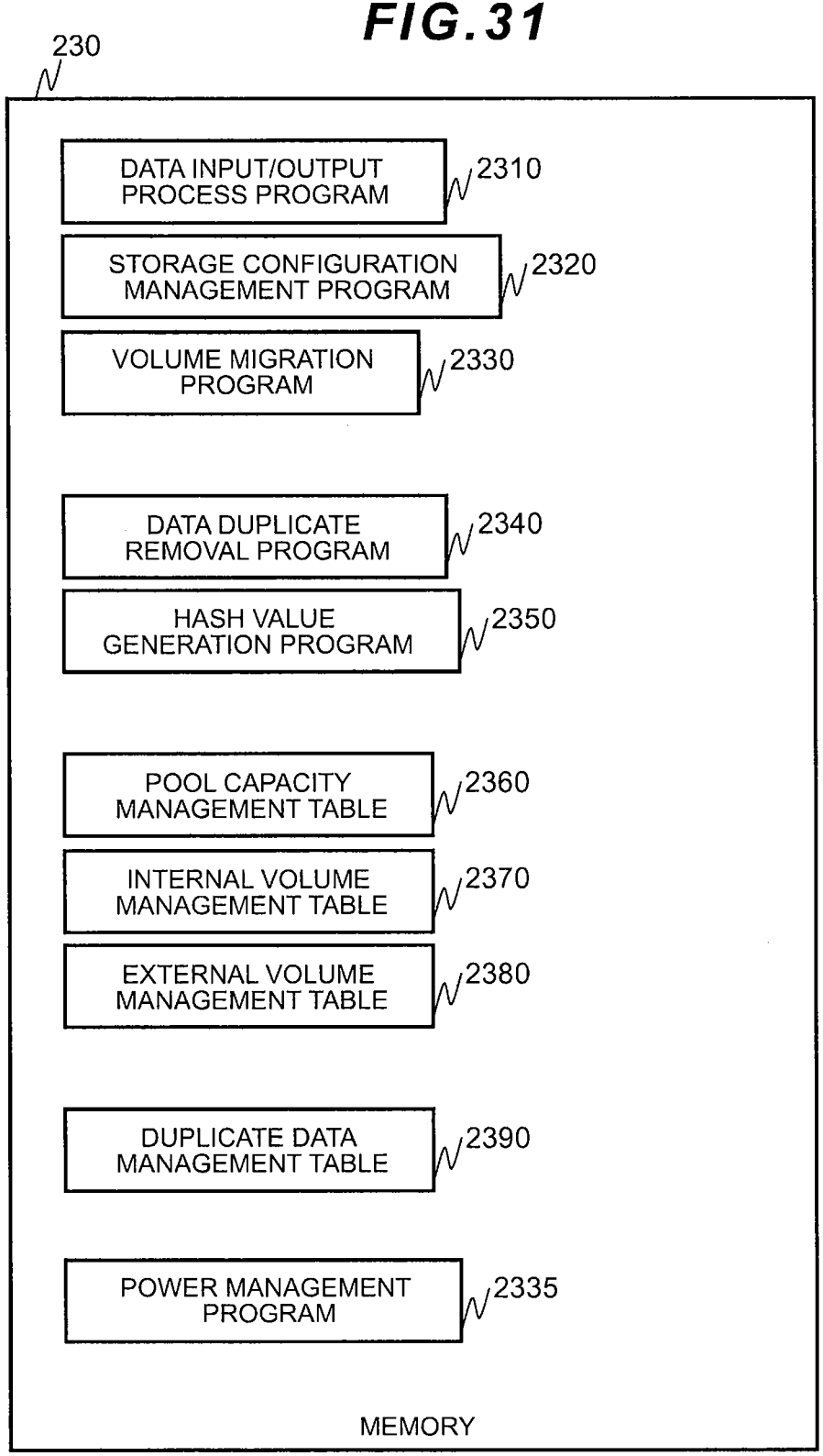
FIG. 31 is a block diagram showing a software configuration of a storage apparatus according to a fourth embodiment of the present invention.

A fourth embodiment of the present invention will be described next with reference to FIG. 31. The fourth embodiment differs from the first embodiment in that a power management program 2335 is provided in the memory 230 of the storage apparatus 200. A configuration which differs from that of the first embodiment will be described hereinbelow in particular detail, while a detailed description of configurations like those of the first embodiment is omitted.

Figure 21:
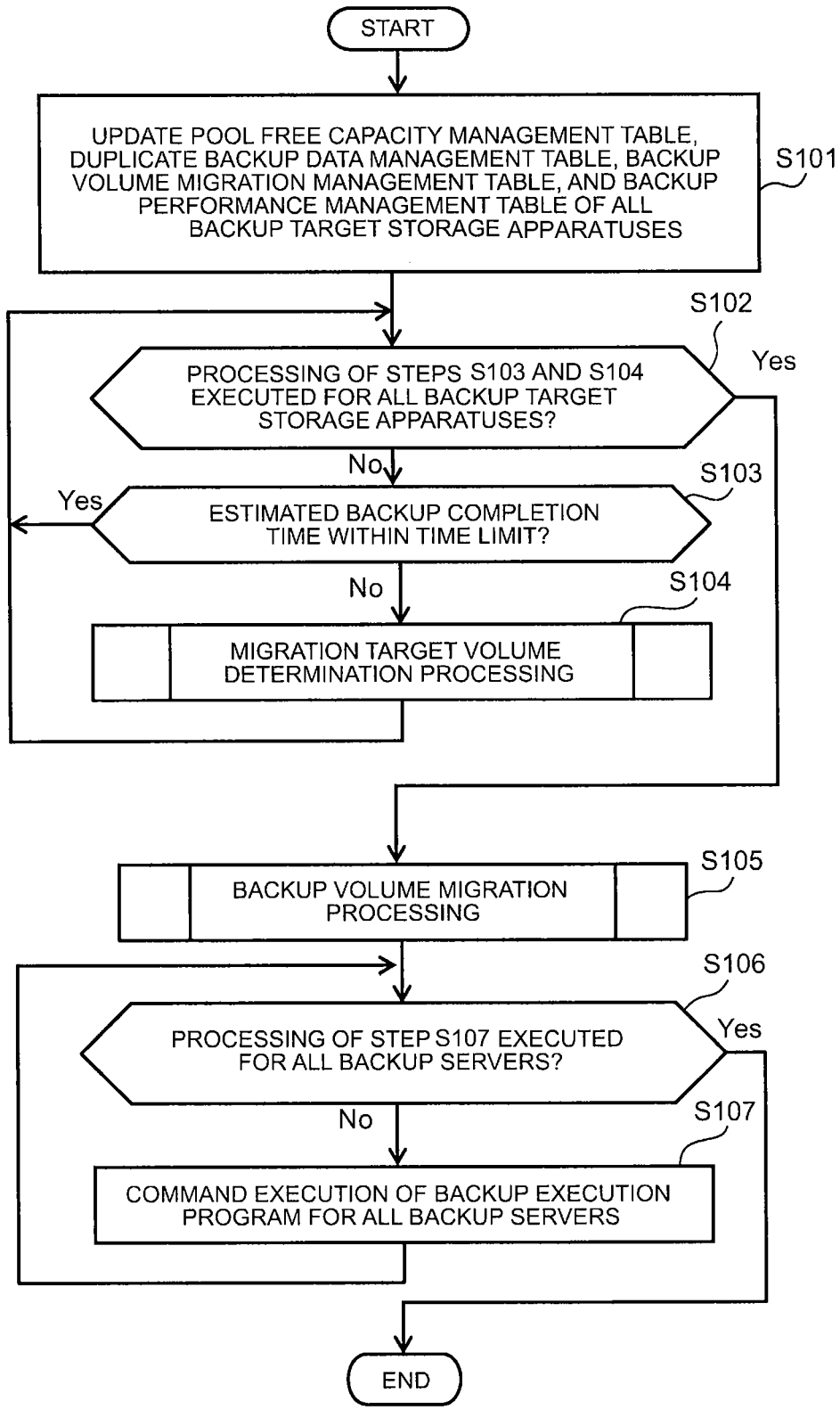
FIG. 21 is a flowchart showing backup processing of data according to the first embodiment.

In this embodiment, a volume which is to serve as a migration target is executed on the premise of electric power conservation. For example, if the storage apparatus 200 is to have its current cut off, the volume in the corresponding storage apparatus 200 is taken as the migration source volume. In this case, the volume determination processing which is the migration target of steps S102 to S104 in FIG. 21 is switched to the processing to select a volume in the storage apparatus 200 which is to have its current cut off. That is, the volume in the storage apparatus 200 which is to have its power cut off is selected as the migration source volume and this volume is migrated to another storage apparatus. When the volume is migrated to another storage apparatus, the migration destination storage apparatus is determined in order to optimize the data duplicate removal efficiency of the migration source volume.

(5) Fifth Embodiment

Figure 32:
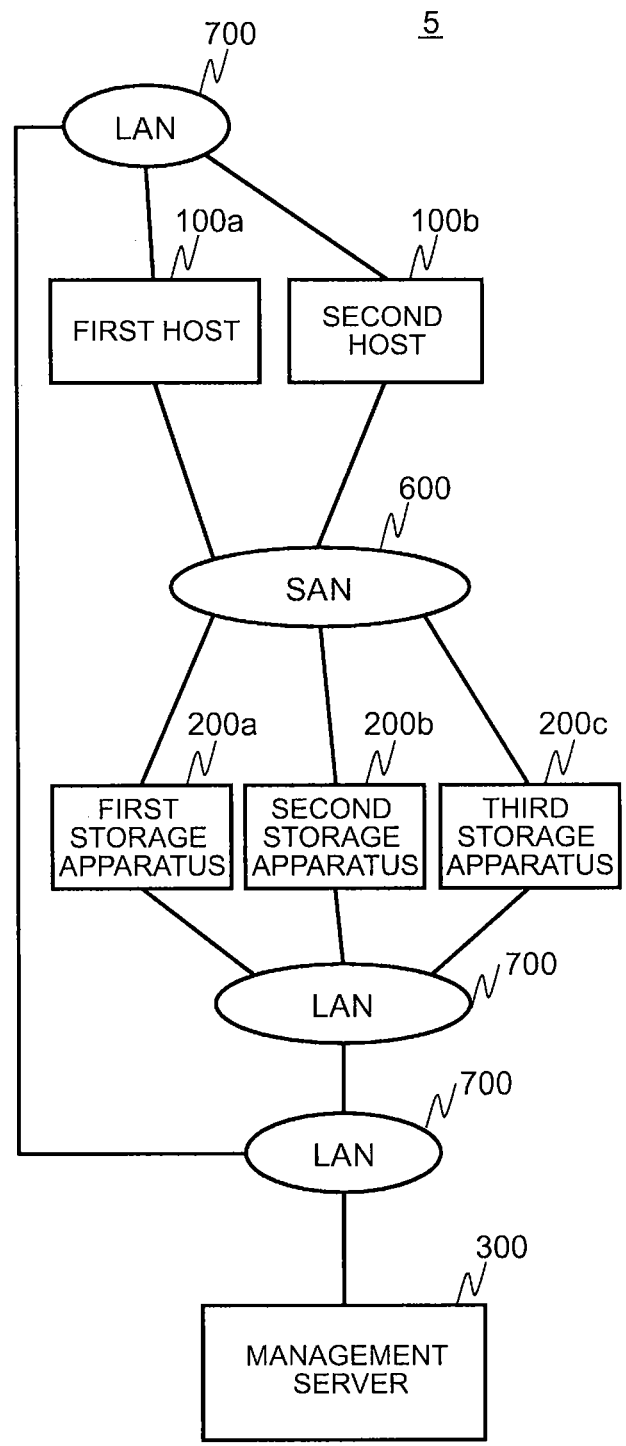
FIG. 32 is a block diagram showing the hardware configuration of a computer system according to a fifth embodiment of the present invention.

A fifth embodiment of the present invention will be described next with reference to FIG. 32. The fifth embodiment differs from the first embodiment in that the present invention is applied to a primary volume rather than a backup target volume. The fifth embodiment differs from the first embodiment in that, in FIG. 32, the computer system 5 according to this embodiment does not comprise the backup servers 400 and backup devices 500.

In the first embodiment, when determining the migration target volume, the determination is made based on whether or not the estimated backup completion time lies within the time limit, whereas in this embodiment, for example, volumes with a low data duplicate removal efficiency among the volumes in the storage apparatuses 200 are migrated to another storage apparatus to improve the data duplicate removal efficiency. According to this embodiment, by distributing the data of a storage apparatus, among the plurality of storage apparatuses 200, which has a large amount of data, bias of volumes with a low data duplicate removal efficiency can be eliminated.

(4) Further Embodiment

Note that in the aforementioned embodiments, based on the various programs stored in the management server 300, the CPU 310 of the management server 300 implements various functions of a backup capacity calculation unit, a migration source data determination unit, a migration destination storage apparatus determination unit and a data migration instruction unit and so on of the present invention but is not limited to this example. For example, the CPU 310 may be provided in another separate device from the management server 300 and be configured to implement various functions in cooperation with the CPU. In addition, various programs stored in the management server 300 may be provided in another separate device from the management server 300 and these programs may be configured to implement various functions as a result of being called by the CPU 310.

Furthermore, for example, each of the steps in the processing of the management server 300 of this specification need not necessarily be processed in chronological order according to the sequence described in a flowchart. That is, each of the steps in the processing of the management server 300 and the like may be executed in parallel despite being different processes.

Furthermore, the hardware installed in the management server 300 or the like such as the CPU, ROM and RAM can also be created by computer programs in order to exhibit the same functions as each of the configurations of the management server 300 described hereinabove. Moreover, a storage medium on which these computer programs are stored can also be provided.

INDUSTRIAL APPLICABILITY

The present invention can be applied to a computer system with which the backup processing time is shortened by improving the duplicate removal efficiency of data in the storage apparatuses.

REFERENCE SIGNS LIST 1, 5 Computer system
100 Host
200 Storage apparatus
2310 Data input/output process program
2320 Storage configuration management program
2330 Volume migration program
2340 Data duplicate removal program
2350 Hash value generation program
2360 Pool capacity management table
2370 Internal volume management table
2380 External volume management table
2390 Duplicate data management table
300 Management server
3310 OS
3320 Backup management program
3330 Free pool capacity management table
3340 Duplicate backup data management table
3350 Backup volume migration management table
3360 Backup performance management table
3370 Backup data reduced capacity estimate management table
3380 Backup data increased capacity estimate management table
400 Backup server
500 Backup device

The invention claimed is:

1. A management server which is mutually coupled via a network to each of a plurality of storage apparatuses, a backup server for storing data stored in the storage apparatuses to a backup device, and a plurality of host apparatuses which request data writing to the plurality of storage apparatuses, the management server comprising:

a backup capacity calculation unit for calculating, on the basis of duplicate information on the data stored in the storage apparatuses, a backup capacity of the data if duplicate data is removed;

a migration source data determination unit for determining, on the basis of the backup capacity of the data calculated by the backup capacity calculation unit, migration target data which is a target for migration among data stored in one of the storage apparatuses; and a migration destination storage apparatus determination unit for determining, on the basis of data duplicate information on the migration target data and data of a storage apparatus which is a migration destination for the data, a migration destination storage apparatus for the data.

2. A management server according to claim 1,
wherein the backup capacity calculation unit migrates the migration target data determined by the migration source data determination unit to the storage apparatus which is the migration destination and calculates the backup capacity of the data if the duplicate data is removed on the basis of the duplicate information, and
the migration destination storage apparatus determination unit determines, as the migration destination storage apparatus, a storage apparatus for which the backup capacity of the data calculated by the backup capacity calculation unit when data is migrated is small.

3. A management server according to claim 1,
wherein the migration source data determination unit takes data stored in a storage apparatus as a migration target if a backup time during which data of that storage apparatus is stored in the backup device exceeds a predetermined time limit.

4. A management server according to claim 1, wherein the migration source data determination unit takes, as a migration target, data stored in a volume for which data duplicate removal rate is low among a plurality of volumes in a storage apparatus.

5. A management server according to claim 1,
wherein the migration destination storage apparatus determination unit determines, as the migration destination storage apparatus, a storage apparatus which has a free capacity equal to or more than a data capacity of the migration target data.

6. A management server according to claim 1,
wherein the migration destination storage apparatus determination unit determines, if the migration target data is migrated, whether or not a backup time during which the backup server stores data stored in the storage apparatuses in the backup device lies within a predetermined time limit, and if it is determined that the backup time lies within the predetermined time limit, the migration destination storage apparatus determination unit determines a storage apparatus as the migration destination storage apparatus of the migration target data.

7. A management server according to claim 6,
wherein the migration destination storage apparatus determination unit determines whether or not a backup time and a data migration time when the migration target data is migrated to another storage apparatus lie within a predetermined time limit, and if it is determined that the backup time lies within the predetermined time limit, the migration destination storage apparatus determination unit determines the another storage apparatus as the migration destination storage apparatus of the migration target data.

8. A management server according to claim 1, further comprising:
a data migration instruction unit for instructing the storage apparatuses to migrate the migration target data which is the target for migration determined by the migration source data determination unit to the storage apparatus which is the migration destination.

9. A management server according to claim 8,
wherein, after the migration target data is migrated, the data migration instruction unit issues an instruction to externally couple the migration destination storage apparatus to the storage apparatus in which the migration target data is stored.

10. A management server according to claim 8,
wherein, after the migration target data is migrated, the data migration instruction unit instructs the host apparatus to change a data input/output destination from a migration source storage apparatus to the migration destination storage apparatus.

11. A management server which is mutually coupled via a network to each of a plurality of storage apparatuses, a backup server for backing up one or more volumes of the storage apparatuses to a backup device, and a plurality of host apparatuses which request data writing to the plurality of storage apparatuses, the management server comprising:
a backup capacity calculation unit for calculating a backup capacity of data stored in the one or more volumes of the storage apparatuses if duplicate data is removed, on the basis of duplicate information on the data stored in the one or more volumes of the storage apparatuses;
a migration source data determination unit for determining a storage apparatus of the plurality of storage apparatuses for which an estimated backup completion time exceeds a predetermined time limit on the basis of the backup capacity of the data calculated by the backup capacity calculation unit, and for determining a volume, among volumes of the determined storage apparatus, for which a data duplicate removal rate is low;
a migration destination storage apparatus determination unit for determining a migration destination storage apparatus for the determined volume on the basis of data duplicate information for data stored in the determined volume and data of the migration destination storage apparatus for the determined volume; and
a data migration instruction unit for instructing the storage apparatuses to migrate the determined volume to the migration destination storage apparatus,
wherein the backup capacity calculation unit migrates the determined volume to the migration destination storage apparatus and calculates a backup capacity of the data if the duplicate data is removed on the basis of duplicate information on the data of the determined volume and data of the migration destination storage apparatus, and
the migration destination storage apparatus determination unit determines, as the migration destination storage apparatus, a storage apparatus for which the backup capacity of the data calculated by the backup capacity calculation unit when data is migrated is small.

12. A data migration method which uses a management server which is mutually coupled via a network to each of a plurality of storage apparatuses, a backup server for storing data stored in the storage apparatuses to a backup device, and a plurality of host apparatuses which request data writing to the plurality of storage apparatuses, comprising:
a step of calculating, on the basis of duplicate information on the data stored in the storage apparatuses, a backup capacity of the data if duplicate data is removed;
a step of determining, on the basis of the calculated backup capacity, migration target data which is a target for migration among data stored in one of the storage apparatuses;
a step of migrating the determined migration target data to a storage apparatus which is a migration destination for the data and calculating a backup capacity of the data when the duplicate data is removed on the basis of the duplicate information; and
a step of determining, as a migration destination storage apparatus, a storage apparatus for which calculated backup capacity when the duplicate data is removed is small.

* * * * *